May 5, 1931.  H. G. TATOSIAN  1,804,039
MACHINE FOR FORMING AND STACKING ICE CREAM CONES
Filed June 22, 1929   13 Sheets-Sheet 1

Fig.1

INVENTOR
*Harry G. Tatosian*

Chamberlain & Newman
ATTORNEYS.

May 5, 1931. H. G. TATOSIAN 1,804,039
MACHINE FOR FORMING AND STACKING ICE CREAM CONES
Filed June 22, 1929 13 Sheets-Sheet 3

INVENTOR.
Harry G. Tatosian
BY
Chamberlain & Newman
ATTORNEYS.

May 5, 1931. H. G. TATOSIAN 1,804,039
MACHINE FOR FORMING AND STACKING ICE CREAM CONES
Filed June 22, 1929 13 Sheets-Sheet 5

INVENTOR.
Harry G. Tatosian
BY
Chamberlain & Newman
ATTORNEYS.

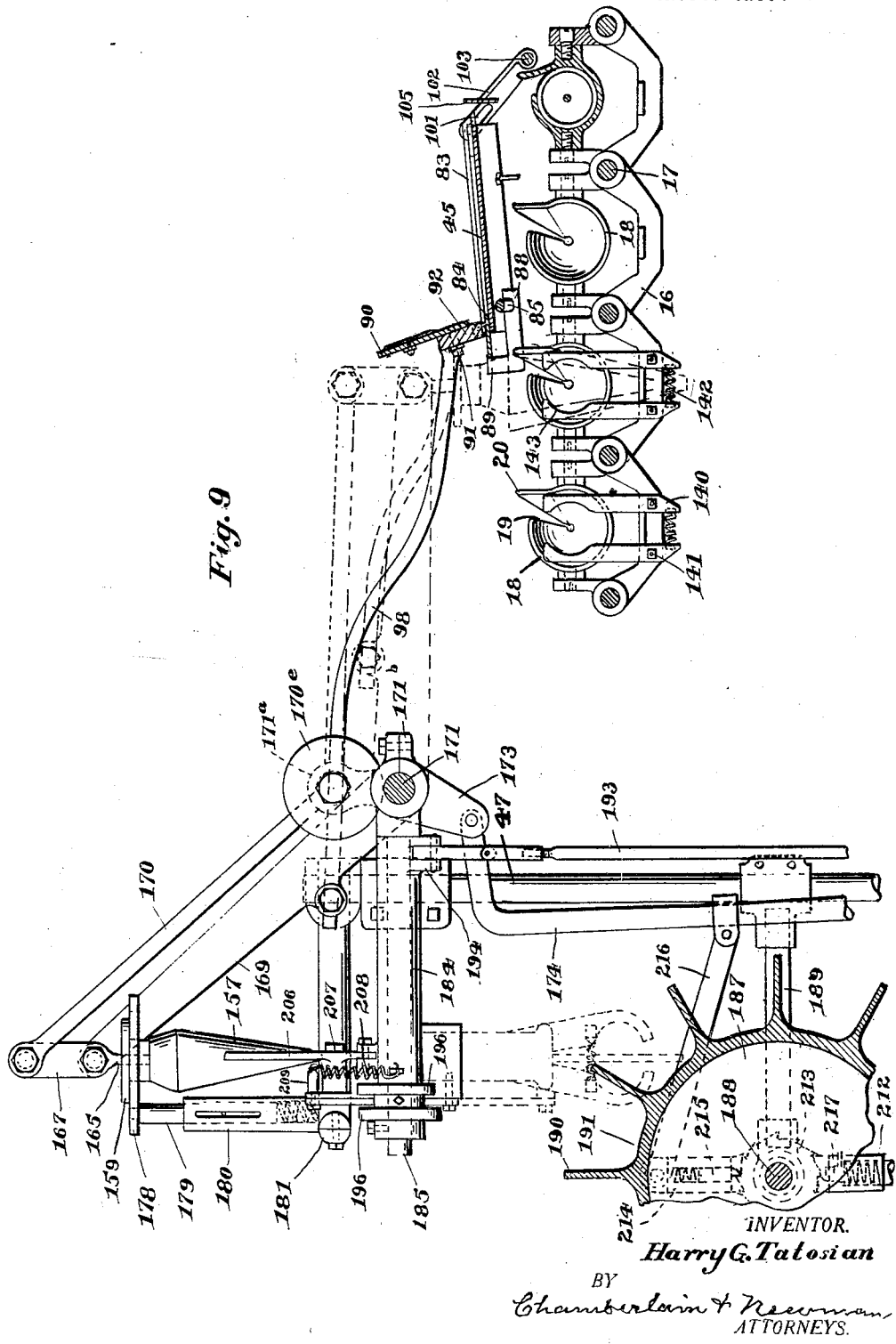

May 5, 1931. H. G. TATOSIAN 1,804,039
MACHINE FOR FORMING AND STACKING ICE CREAM CONES
Filed June 22, 1929 13 Sheets-Sheet 10
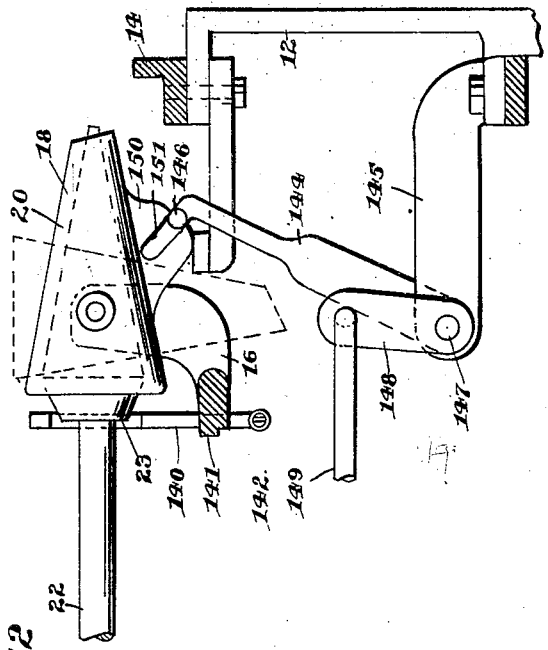
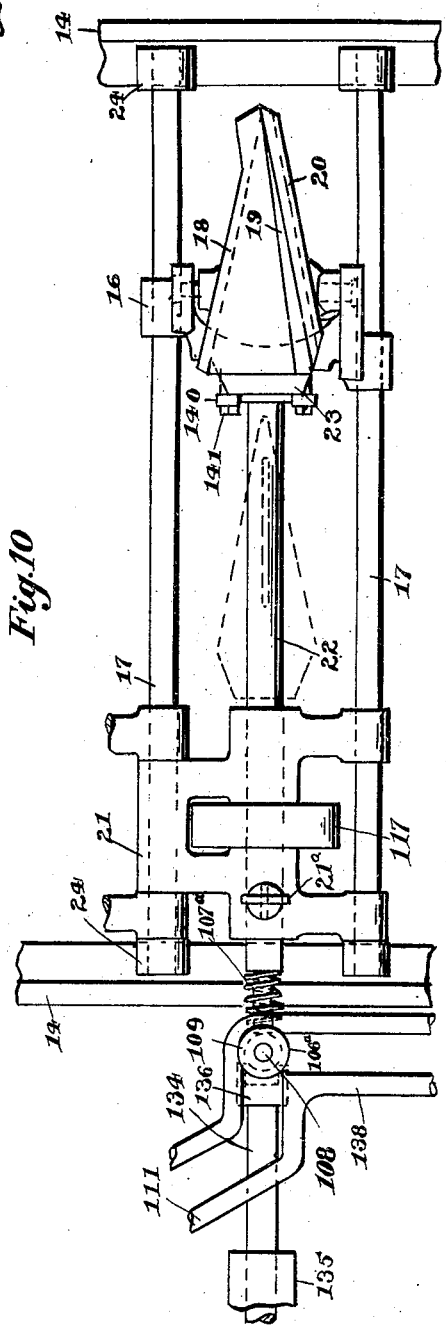
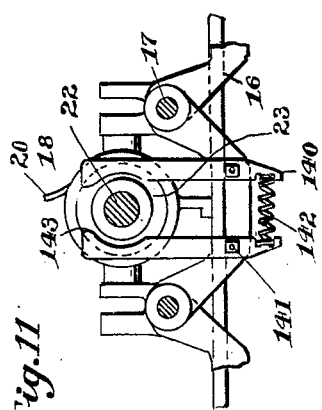
INVENTOR.
*Harry G. Tatosian*
BY
Chamberlain & Newman
ATTORNEYS.

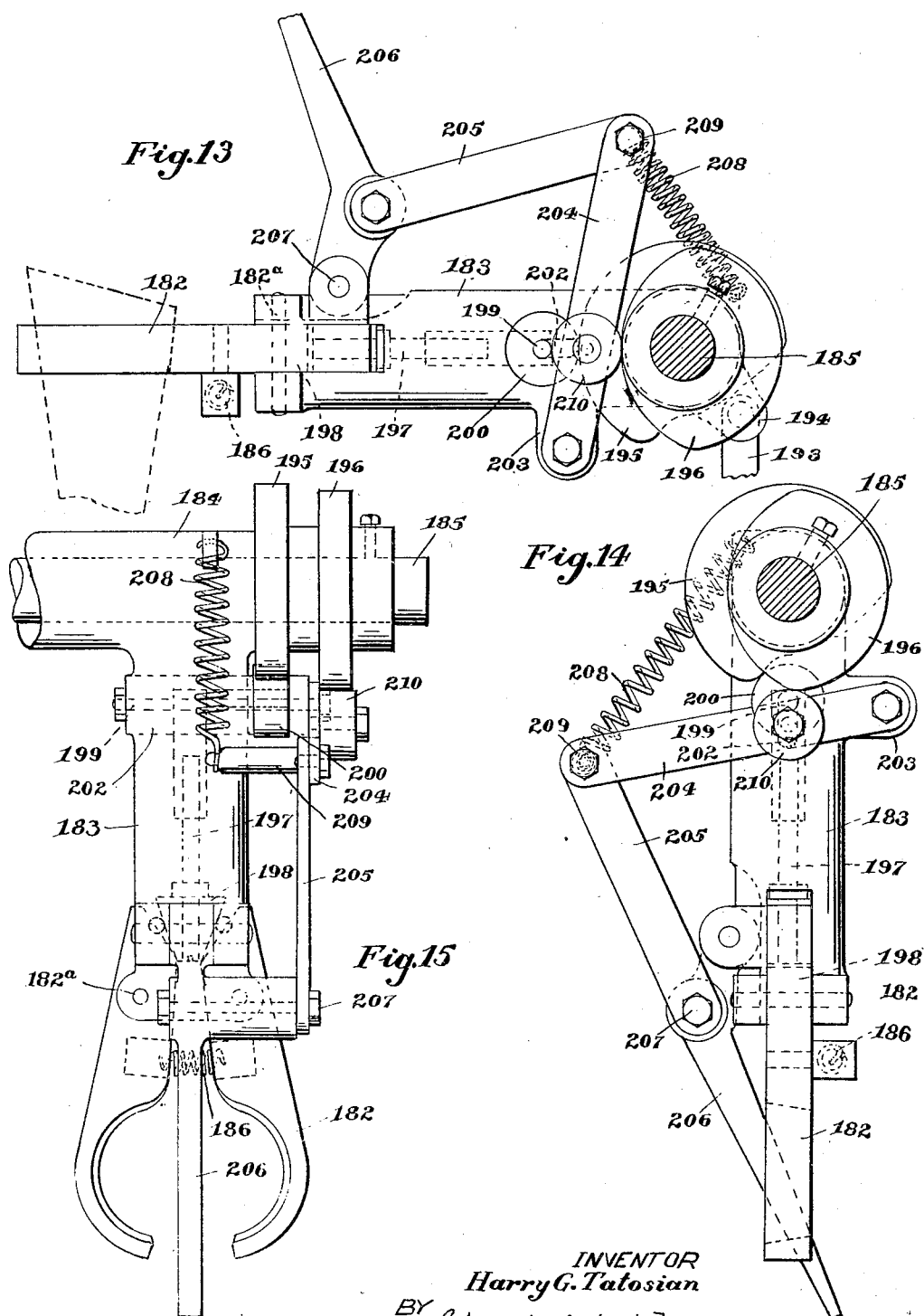

May 5, 1931.  H. G. TATOSIAN  1,804,039
MACHINE FOR FORMING AND STACKING ICE CREAM CONES
Filed June 22, 1929   13 Sheets-Sheet 12
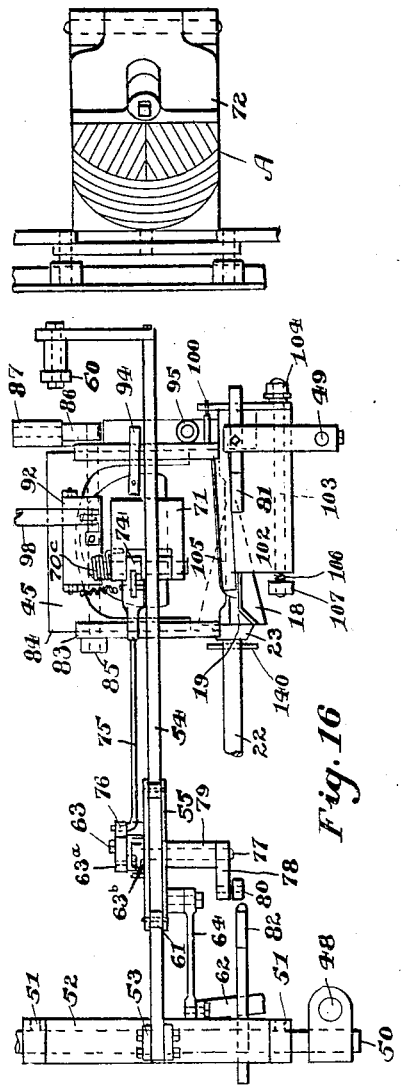
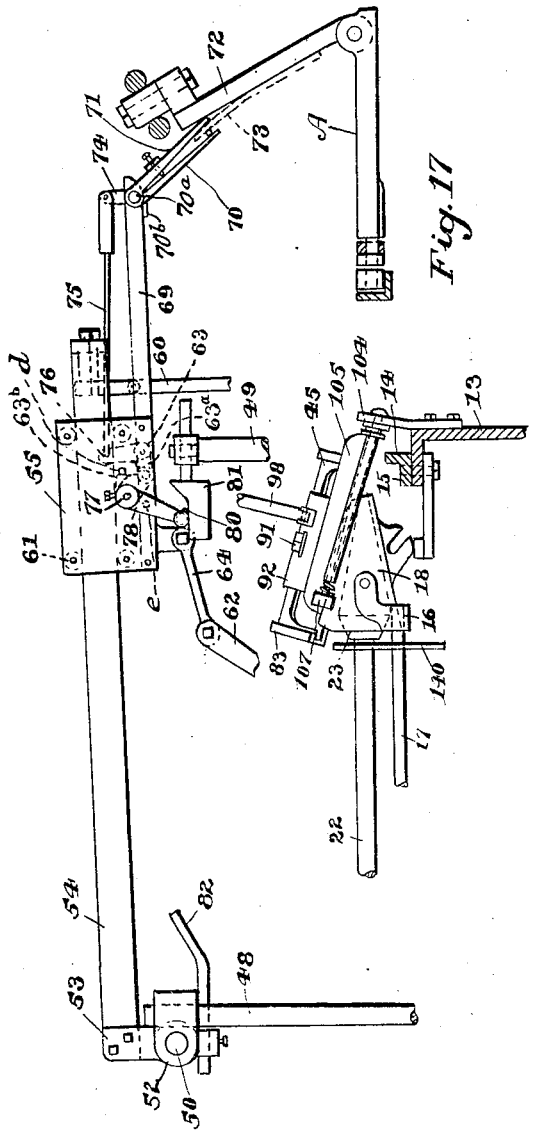
INVENTOR.
*Harry G. Tatosian*
BY
*Chamberlain & Newman*
ATTORNEYS.

May 5, 1931. H. G. TATOSIAN 1,804,039
MACHINE FOR FORMING AND STACKING ICE CREAM CONES
Filed June 22, 1929 13 Sheets-Sheet 13
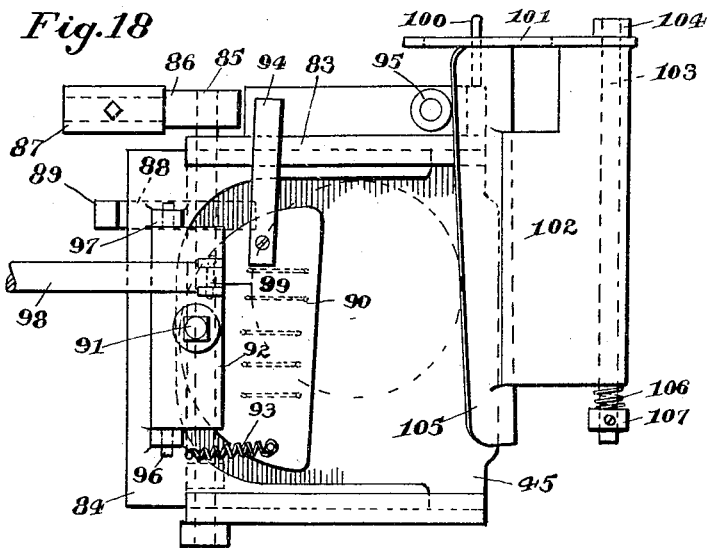
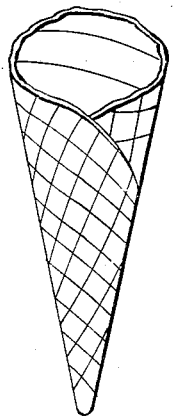
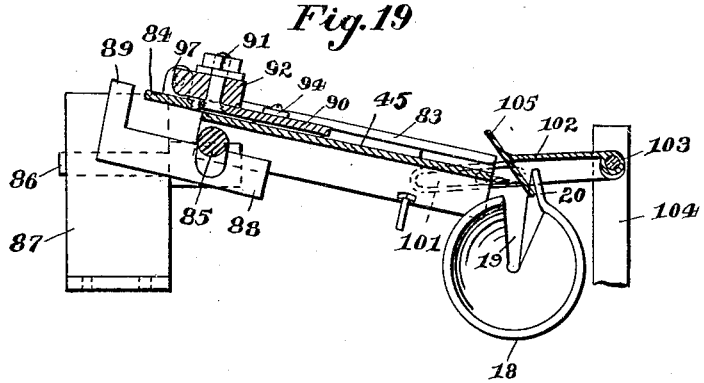
INVENTOR.
Harry G. Tatosian
BY
Chamberlain & Kerrmann
ATTORNEYS.

Patented May 5, 1931

1,804,039

UNITED STATES PATENT OFFICE

HARRY G. TATOSIAN, OF BRIDGEPORT, CONNECTICUT, ASSIGNOR TO ICE CREAM CONE MACHINERY, INC., OF BRIDGEPORT, CONNECTICUT, A CORPORATION OF CONNECTICUT

MACHINE FOR FORMING AND STACKING ICE CREAM CONES

Application filed June 22, 1929. Serial No. 372,907.

This invention relates to new and useful improvements in pastry ice cream cone machines, and particularly to pastry cone forming machines, wherein cones are formed from a baked pastry cake while in a flexible or pliable condition by automatically rolling the cake to form a cone.

The invention contemplates a machine of the above mentioned character, including a novel construction of means for successively picking the baked cakes from a baking machine, and conveying the same to a mold of proper configuration, and in which each cake is rolled into a cone-shape by means of a suitable mandril, which presses and holds the cake in cone formation until it becomes hardened, in condition to be removed.

In carrying out the invention I comprehend a novel construction of means for removing the cones from the mold in which they are formed, and conveying the cones to a stacking device, wherein the cones are nested one within the other, as for instance one dozen in a stack, and from which said stacks are removed onto a conveyor or the like, and carried to an appropriate destination for packing.

The invention aims to provide a machine of the above mentioned character, by means of which pastry ice cream cones are formed from baked pastry cakes, in a manner which will insure the making of good salable cones at a fair rate of speed, with comparatively little loss of cones by breakage, since all of the operations involved in the making, as well as the stacking of the cones is done by machinery, and in quick order while the cones are yet warm and pliable, and thus not so liable to breakage as when handled by the old manual methods.

The production of a practical machine of this type is also very desirable from a humanitarian standpoint, since it does not require the constant and close attention of an attendant standing over the hot baking machine for the purpose of removing the cakes therefrom and placing them into the molds, as is necessary with the old method of making so called sugar cones.

Other objects and advantages will appear when the following detail description is read in connection with the accompanying drawings, the invention residing in the construction, combination and arrangement of parts hereinafter more fully described, and particularly pointed out in the appended claims.

It is to be understood, however, that what is herein shown and described merely constitutes one embodiment of the invention, and such changes in form, size and other details of construction may be resorted to when desired as fall within the scope of what is claimed.

In the drawings like numerals of reference indicate similar parts in the several views and wherein:

Figure 1 is a plan view of the machine forming the subject matter of the present invention.

Figure 9 shows an enlarged longitudinal sectional view through the upper portion of the machine, illustrating molds, and the cone removing and stacking mechanism.

Figure 10 shows an enlarged detail plan view of one of the molds and its cooperating mandril, together with certain associated cooperating parts.

Figure 11 is a view taken at a right angle to Figure 12 showing the assembled mold, and the stripping mechanism therefor.

Figure 12 is an enlarged detail view partly in section showing one of the associated molds by full lines, and also by dotted lines the vertical position which each mold assumes at a predetermined period during the operation of the machine.

Figure 13 is a side elevation of the swinging arm and its associated parts which convey the finished cones to the stacker.

Figure 14 is a similar view showing the extreme lower operative position of the swinging arm, and which position it occupies as it transfers the cone into the stacker.

Figure 15 is a view taken at a right angle to Figure 14.

Figure 16 is a plan view of the cake feeding mechanism for the molds, and also showing its relation to the baking iron.

Figure 17 is a sectional side elevation of the feed mechanism shown in Figure 16, the parts being in different positions.

Figure 18 is an enlarged plan of the cake receiving and feeding pan and its associated parts.

Figure 19 is a cross sectional view of the pan illustrated in Figure 18.

Figure 20 is a longitudinal sectional view of the mandril employed for lifting the cones from the molds and conveying them to the stacking mechanism.

Figure 21 is a view of one of the cones.

Fig. 22 shows a detached side view of the bearing bracket and connections for operating same, shown in Figs. 4 and 8.

Figure 2:
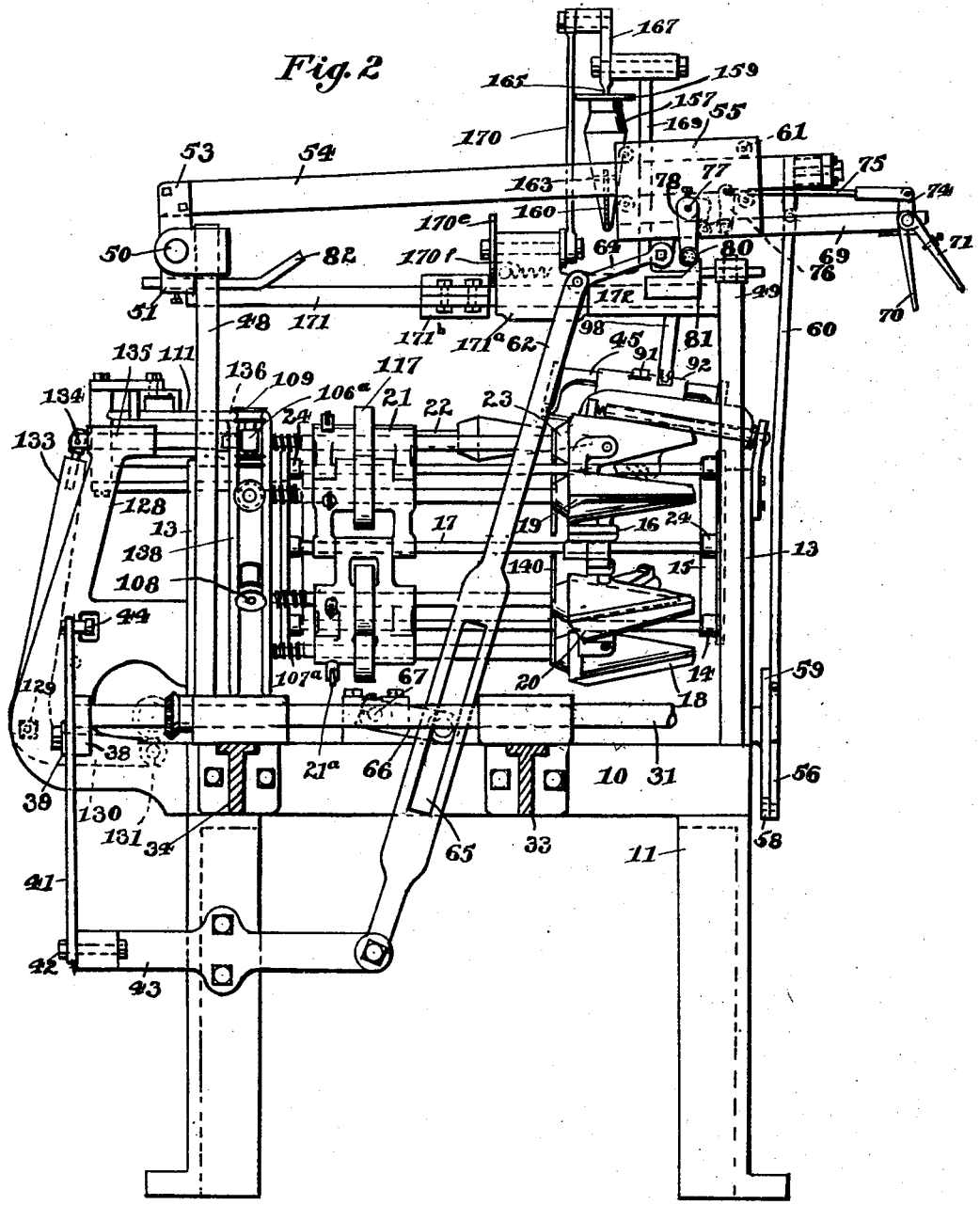
Figure 2 is one end elevation of the machine showing one position of the picking mechanism, which lifts the baked cake from the baking iron in a manner to be hereinafter described.
Figure 3:
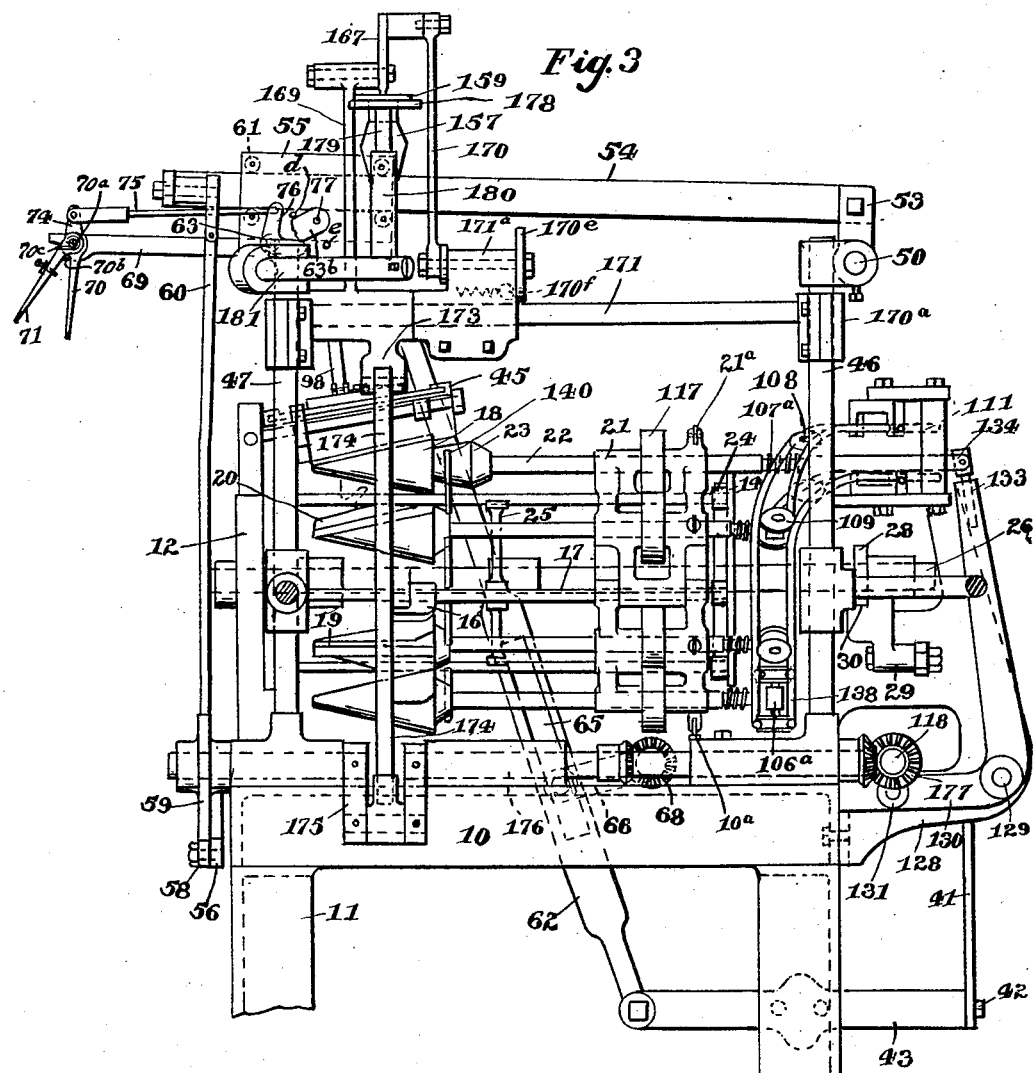
Figure 3 is a rear end elevation of the machine with the cone stacking mechanism removed.
Figure 23:
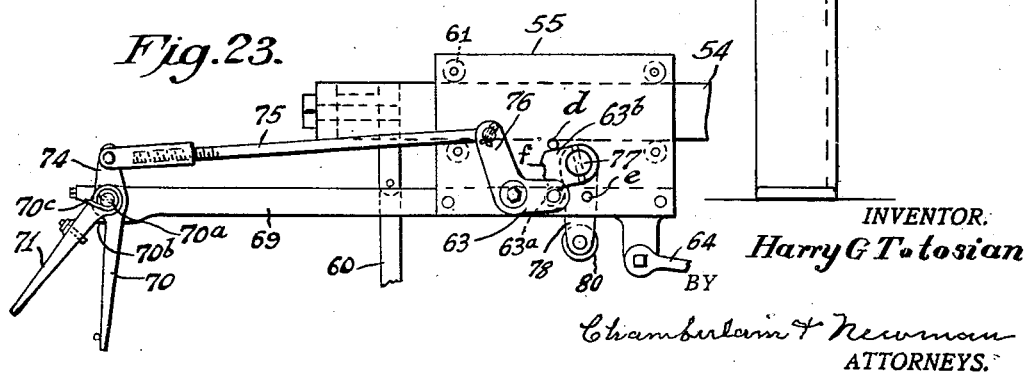
Fig. 23 shows an enlarged side elevation of the reciprocatory slide carrying cake picking jaws and operating mechanism, shown in Figs. 3 and 17.

It will of course be understood that the machine constituting the subject matter of the present invention is designed for use in connection with a baking machine (not shown) of any suitable type, from which the machine is operated, so as to insure proper timing of the operations of both machines, and which necessarily must work in unison to insure the picking of the cakes from the baking irons, of the baking machine at proper intervals, at which time the cakes of course are baked and exposed for removal.

The machine is especially well adapted and has been successfully operated in connection with baking machines including an endless chain of baking irons, such as for instance as that illustrated in my Patent No. 1,540,041, which includes two lines of baking irons capable of producing at least forty cakes per minute. It will be obvious, however, that my present invention can be used to equal advantage in connection with other types of baking machines including the rotary table type, with which but one of the machines constituting the present invention would be required to take care of the output. However, when the invention is used with double line of baking irons as illustrated in my patent above identified, two of the machines illustrated in this application must be employed to take care of the total output of the baking machine, one on each side of the latter. Consequently with the latter mentioned hook-up, there would be one baking machine, and two of my present form of machines, arranged at either side of the baking machine, the three being connected to be driven in unison through the drive shaft of the baking machine which could obviously be either motor or belt driven.

However, for the sake of clearness I have herein shown only the baking irons of the baking machine above referred to, since it will be obvious from an inspection of the drawings, that one of the machines constituting the present invention, would of necessity have to be located adjacent the baking irons, and in close proximity thereto, so that the picking mechanism of the machine would be capable in its operation of successively lifting the baked cakes from the irons as the latter alternately move forward with a step by step motion.

Referring to the drawings in detail, and more particularly Figs. 1 to 4 inclusive, 10 indicates the bed of the machine, which is preferably supported on suitable legs 11. Rising from the bed adjacent each end of the latter is a pair of standards, the standards of one pair being indicated at 12 and those of the other pair being indicated at 13. Supported by these standards are spaced oval-shaped flanged track members 14 about which travels a carrier for the molds, in which the pliable baked cakes are given their desired configuration. Also supported by the standards above referred to are runways 15 which are located below and in spaced relation to the adjacent track members as clearly illustrated in Figure 8.

The carrier for the molds comprises a pair of spaced endless chains arranged adjacent the respective track members, the links of one chain supporting the molds proper, while the links of the other chain support the spindles of the cooperating cone-shaped mandrils for the respective molds. Upon reference to Figures 9 and 11 of the drawings it will be noted that the links 16 of the endless chain supporting the molds proper are substantially yoke-shaped, with the adjacent links supported upon the transverse rods 17 which also support the links of the other chain at the opposite side of the machine. Pivoted upon each yoke-shaped link 16 of one of the chains is a conical-shaped mold 18, longitudinally slotted as at 19 and having one side flared upwardly as at 20 to assist in directing the pliable cake into the mold in a manner to be hereinafter described. Each mold 18 is supported upon its yoke-shaped link for tilting movement, the normal position of each mold being horizontal, but capable of being tilted from a horizontal to a vertical position as illustrated by dotted lines in Figure 12, at a predetermined interval during the travel of the molds about the track, and in a manner and for a purpose to be hereinafter more fully described.

Upon inspection of Fig. 10 it will be noted that each link 21 of the other endless chain which support the spindles 22 of the cone-shaped mandrils 23 are constructed as shown in Fig. 10 to embrace two adjacent rods 17 which connect the endless chains together. Each of these links 21 also constitutes a bearing for the spindle 22 of the adjacent mandril 23, and each spindle is capable of longitudinal sliding movement through its particular link 21 in a manner and for a purpose to be hereinafter described. Each of the links 21 carries a short stud in which is mounted a roller 21ª that rides upon a short track member 10ª secured to the top of the bed in a way to further support the connecting links of the carrier as they travel rearward to the lower portion of the machine. It will also be noted upon inspection of Fig. 10 that the transverse rods 17 are terminally equipped with rollers 24 which ride upon the flanged track members 14.

Figure 4:
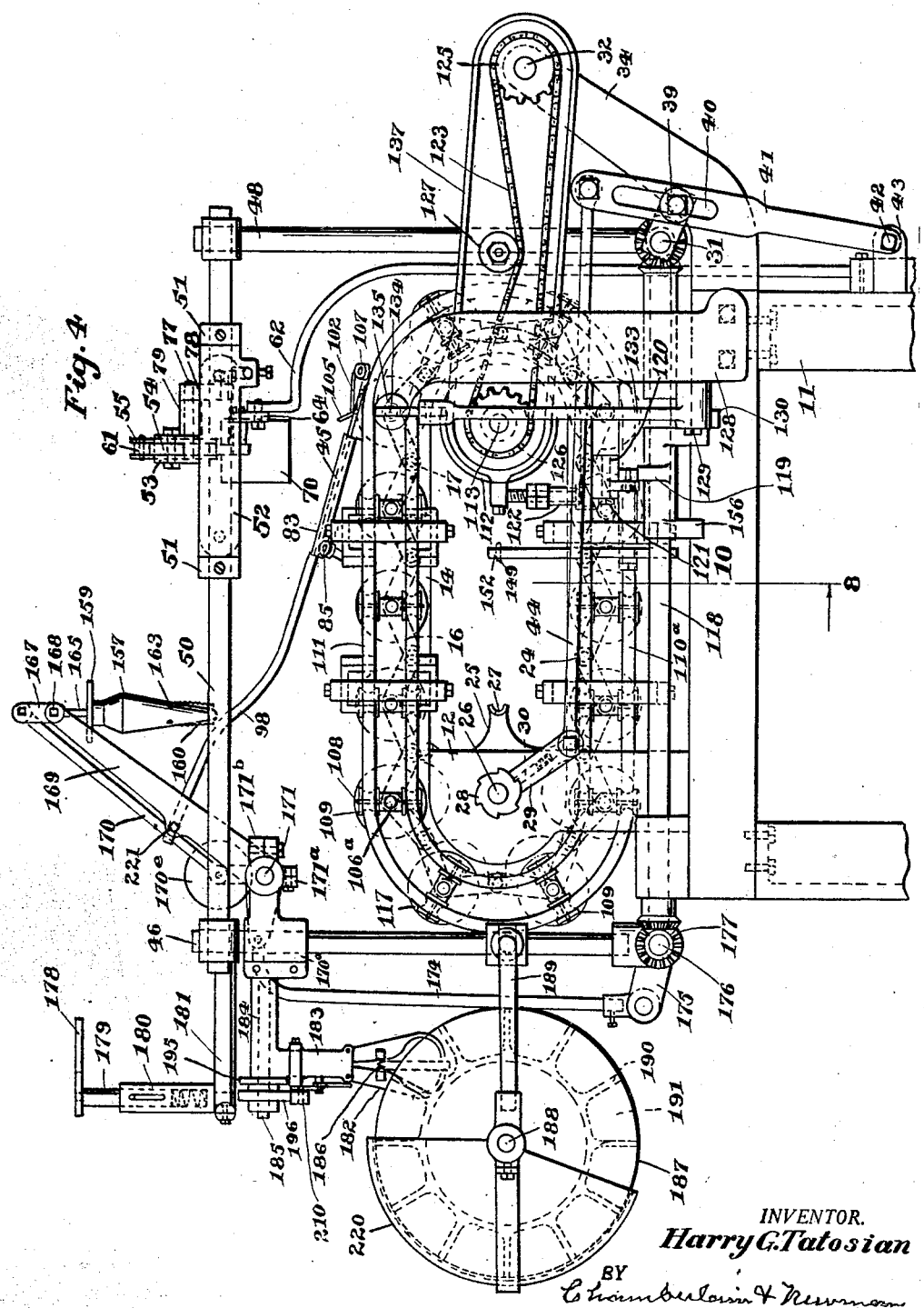
Figure 4 is a side elevation of the machine.

While this carrier may be operated in any suitable manner, I preferably employ a sprocket wheel 25 which is fixed upon a shaft 26 journaled in the uprights 12 at one end of the machine as clearly illustrated in Fig. 4. This sprocket is formed with equidistantly spaced arms terminating to provide sockets 27 which engage the transverse rods 17 above referred to, to impart movement of the carrier incident to the rotation of the sprocket as will be readily understood. Fixed to one outer end portion of the shaft 26, carrying the sprocket 25 is a ratchet wheel 28, while pivotally mounted upon the shaft adjacent this sprocket is an arm 29 supporting a spring pressed pawl 30. The arm 29 is oscillated, and as the pawl 30 successively engages each tooth of the ratchet wheel, the shaft 26 is rotated to operate the carrier.

As hereinabove stated my machine is adapted to be driven or operated from the baking machine in connection with which it is used, and upon reference to Fig. 1 it will be noted that I employ a pair of spaced transverse shafts 31 and 32 respectively which are journalled in suitable bearings 33 and 34 carried by the frame of the machine. The shafts 31 and 32 are driven by the shafts 35 and 36 forming a part of the baking machine, and between which shafts and the driven shafts 31 and 32 I employ suitable flexible couplings 37. The major portion of the mechanism of my present invention is operated from the driven shaft 31, and for the purpose of operating the sprocket wheel 25 above referred to, I provide one end of the shaft 31 with a crank arm 38 clearly illustrated in Fig. 4. This crank arm 38 carries a roller 39 which operates in a longitudinal slot 40 formed in a lever 41, the latter being pivoted at its lower end as at 42 upon a suitable bracket 43. The upper end of the lever 41 is connected with the oscillating arm 29 by a reciprocatory rod 44, so that incident to the rotation of the driven shaft 31, the lever 41 will be actuated to oscillate the arm 29, and thereby rotate the sprocket 25 through the pawl and ratchet mechanism above described.

In Fig. 1 is indicated a cake receiving pan 45 which is located above the course of travel pursued by the molds 18, as each mold is advanced a cake is fed therein from the pan 45 in a manner to be hereinafter described. The location of the machine including this receiving pan 45, with relation to the baking irons is also clearly illustrated in Figs. 16 and 17, wherein I have also shown the picking mechanism employed for successively picking the baked cakes from the baking irons indicated generally at A, and conveying said cakes singly to the receiving pan 45.

In connection with the description of this picking mechanism, it will be noted upon inspection of Figure 1 that the machine includes four corner posts indicated at 46, 47, 48 and 49 respectively. The posts 46 and 48 support therebetween a longitudinal rod 50 upon which are mounted spaced collars 51 more clearly illustrated in Figure 4. Carried by the rod 50 and located between the collars 51 is a rocker sleeve 52, from which rises a pair of spaced apertured lugs 53 to which is rigidly attached an arm 54 extending across the machine as clearly illustrated in Figures 1 and 3. It will thus be manifest that the arm 54 is hingedly supported through the medium of the rocker sleeve 52 on the longitudinal rod 50. This arm 54, whose forward end is adapted to be raised and lowered, has no other movement, and serves as a guide and support for the slide 55 which carries the cake picking jaws, to be hereinafter referred to. Up and down movement of the arm 54 is controlled by means of a lever 56 pivoted as at 57 at an appropriate point in its length upon the bed of the machine as clearly illustrated in Figure 5. This lever supports at one end a roller 58 which cooperates with a cam 59, the latter imparting movement to the lever, the other end of which is connected with the arm 54 by a suitable rod 60.

The slide 55 carrying the cake picking jaws, is preferably made up of two sheet metal companion sections suitably connected together, and between which are arranged at the corners thereof rollers 61, two of these rollers engaging the upper edge of the arm 54, and two engaging the lower longitudinal edge of said arm, to minimize friction and to insure a smooth operation of the slide on the arm. This slide is adapted to be reciprocated along the arm from the position shown in Figs. 1 and 17 to that which it occupies in Figs. 2 and 16, and serves to carry the cake from the baking irons to the receiving pan 45 above referred to, from where the cake is fed into one of the molds.

This reciprocatory movement is imparted to the slide 55 through a lever 62, which as shown in Fig. 2 has its lower end pivoted upon an arm of a bracket 43 attached to the adjacent leg of the machine, and its upper end connected with the slide by means of a link 64. This lever 62 as shown in Fig. 2 is longitudinally slotted as at 65 for a portion of its length and operating in the slot is a roller carried by a crank arm 66 secured to a shaft 67 journaled in bearings on the bed and driven through bevelled gear connections 68 from the shaft 176.

The slide further includes an extension 69, which projects forwardly from the slide and utilized to support the cake picking jaws 70 and 71 respectively. The latter mentioned jaw is mounted upon a fixed shaft $70^a$ carried by the extension 69 and is normally retained against a shoulder $70^b$ of the arm 69 by means of a spring $70^c$. This jaw 71 is arranged at the proper angle with relation to the extension 69 of the slide to pass in between the upper section 72 of the baking iron and the edge portion of the cake 73 illustrated by dotted lines in Fig. 17. The lower jaw 70 is hingedly mounted on the shaft $70^a$ to cooperate with the upper jaw 71, and thereby grip the cake so that the same can be stripped from the baking iron and conveyed back to the receiving pan 45 above referred to. The movable jaw 70 is provided with a lug extension 74 connected with one end of a reciprocatory rod 75, the other end of which is connected to the branch 76 of a bell crank lever pivoted at 63 to one side of the slide 55. The other branch $63^a$ of this bell crank lever carries a roller that engages a short arm $63^b$ mounted upon the rocker shaft 77 journaled in the lower portion of the slide 55 and an extension 79 thereof. This rocker shaft 77 also carries a depending arm 78 upon its outer end which bears a roller 80 as clearly shown in Figs. 16 and 17. It will thus be seen that the short arm $63^b$ secured to the rocker shaft 77 and the longer arm 78 swing together, said movement being limited in one direction by a pin "$d$" secured in the slide 55 and in the other direction by a similar pin "$e$" also secured in the slide. It will further be observed that a detent pocket "$f$" is formed in the outer end of this short arm $63^b$, that serves to receive the roller on the short arm 63 in a manner to hold the same, and the jaws closed, when the outer arm 78 has been acted upon by the cam 81. This holding by the arm $63^b$ of the bell crank lever and the jaws serves to grip a cake between the two jaws, said gripping movement being slightly yieldable, not through any action of the lower jaw but through a slight movement of the upper jaw, due to the yieldability of its spring $70^c$ which retains it in a normal position. The roller 80 is adapted to cooperate with a cam 81 supported on the upper end of the post 49, for operating and closing the movable jaw as the slide is moved forwardly and downwardly upon the arm 54. The baked cake 73 is then engaged between the jaws 70 and 71, and held thereby during the reverse movement of the slide 55 upon the arm 54, and when the cake is arranged above the receiving pan 45, the roller 80 contacts a cam 82 carried by the rocker sleeve 52, thereby disengaging the notched end of the short arm $63^b$ from the roller of arm $63^a$ in a manner to release the bell crank and the lower jaw which normally drops open to release the cake and allow it to drop onto the feed pan. From there, the cake is fed into the adjacent mold 18.

The cake receiving pan 45 and its associated parts is more clearly illustrated in Figs. 9, 18 and 19, and is preferably formed from a single blank of sheet metal, having its opposed sides flanged as at 83 to provide guideways for a substantially U-shaped slide 84 utilized to assist in feeding the cake into the adjacent mold. The receiving pan 45 is hingedly supported upon a rod 85, one end of which is secured in an arm 86 carried in a post 87 also illustrated in Fig. 5, and secured to the frame or track 14. A stop 88 including a flanged extremity 89 is secured beneath the receiving pan 45, with the offset extremity 89 disposed in the path of movement of the slide 84, which comes in contact with said extremity in its extreme rearward position.

A substantially semicircular-shaped gripping plate is indicated at 90 and cooperates with the slide 84 in accurately feeding the cake from the pan 45 into the adjacent mold 18. The plate 90 is provided with an upstanding stud 91 that is mounted to turn in a hinged member 92, and said gripping plate is also provided with a spring 93, one end of which is secured to the plate 90 adjacent one side thereof, and its other end secured to the slide 84. The purpose of the spring 93 is to normally maintain the gripping plate in a slight angular position as indicated in Figure 18, the purpose for which will be presently apparent. Projecting from the side of the plate 90 opposite to that which the spring is secured is a finger 94 adapted to engage a roller 95 supported on the adjacent track member of the frame, for the purpose of tilting the plate upon its stud or pivot 91, against the action of the spring 73. This swinging movement of the plate 90 imparts a slight annular movement to the cake, in addition to the forward movement thereof imparted by the slide 84, so as to better advance the cake slightly faster into the small end of the mold, than in the larger end thereof.

The hinged member 92 is provided with aligned pintles 96 that are journaled in suitable bearings 97 formed on the slide 84. One end of a connecting rod 98 is pivotally connected with the hinged member 97 as at 99 in Figure 18, and as will be seen, forward of the pintle alignment, so that initial backward movement of the connecting rod 98 will serve to draw the slide 84 back to its rear position against the stop 89, and upon further movement of said connecting rod in the same direction, the hinged member 92 will be caused to swing upon its pivot, and raise with it the gripping plate 90 to the position illustrated in Fig. 9. With the parts in this position, a continued backward movement of the connecting rod will cause the receiving pan 45 to swing upon its pivot 85, thereby causing the forward end of the receiving pan to rise from the position illustrated in Fig. 19, to that shown in Fig. 9, and in which raised position the cake is deposited upon the receiving pan 45 when released from the picking jaws 70 and 71 respectively.

Figure 5:
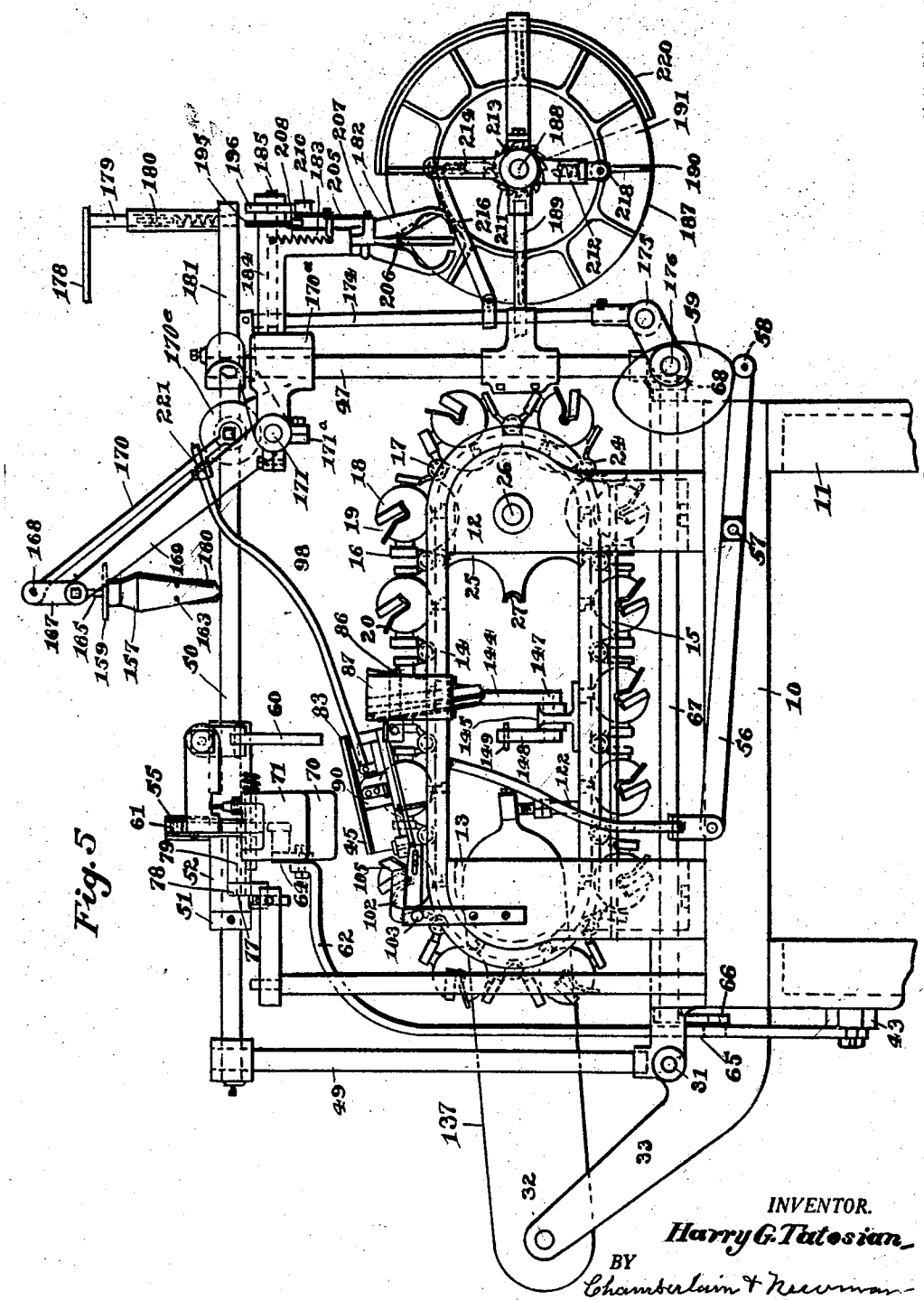
Figure 5 is a view looking at the side of the machine opposite that illustrated in Figure 4, and showing the side of the machine that lies adjacent the baking machine.

In this connection it will be noted that a pin 100 projects laterally from the forward outer corner of the receiving pan 45, and is received by the slot 101 formed in one end of a pivotally mounted cake guiding member 102. This cake guiding member 102 is pivotally mounted upon a shaft 103 that is supported in a post 104 secured to the adjacent track 14 as illustrated in Fig. 5. This cake guide 102 includes an angularly disposed deflector 105, that extends across its forward edge in close proximity to the adjacent edge of the pan 45, and also extends slightly within the longitudinal slot or opening in the mold 18 as illustrated in Fig. 19, so as to properly direct the edge portion of the cake into the mold, when the cake is being moved forwardly by the slide 84 and gripping plate 90. The pivot rod 103 for the cake guiding member projects a slight distance beyond one end thereof and is surrounded by a tension spring 106, interposed between one end of the guiding member and a collar 107 secured to said pivot.

From the foregoing it will be manifest that after a cake has been dropped upon the receiving pan 45, while the latter is in its elevated position illustrated in Fig. 9, the initial forward movement of the connecting rod 98, will first cause the gripping plate 90 to be lowered upon the cake, and at the same time permit the forward end of the pan 45 to be lowered from its raised position shown in Fig. 9 to the position it occupies in Fig. 19. The receiving pan 45 and its associated parts as supported by their pivot 85 and 103 respectively, are disposed at a slight angle to agree with the tapered configuration of the mold 18, that is to say, the inner side of the pan 45 is slightly higher than the outer side to properly position the pan in harmony with the tapered contour of the mold 18. The continued movement of the connecting rod 98 in a forward direction, causes the cake to be slid off the pan into contact with the deflector 105 of the cake guide, which directs the cake into the mold 18, while the finger 94 will engage the roller 95 causing the gripping plate 90 to swing as above described, against the tension of the spring 93, and thus feed one edge portion of the cake into the small end of the mold slightly faster than the cake is fed into the larger end of the mold. After this operation, the slide 84 is moved rearwardly upon the pan 45 until it contacts the stop 89, and on continued movement of the connecting rod in a rearward direction, the receiving pan and its associated parts will be returned to the position illustrated in Fig. 19, in which position they are ready to receive another cake.

It is to be understood that each mold 18 is fed a cake from the pan 45, as each mold is moving to a position in proper relation to the pan for this purpose. As each cake is initially fed into the mold 18, its cooperating cone-shaped mandril enters the latter with a slight turning motion, gripping the cake and rolling the latter about the mandril to shape the cone. As above stated the cake is in a pliable condition at this step of the operation, and can be quickly and accurately formed in this manner. As shown in Fig. 1 these cone-shaped mandrils are supported by the links of their respective chain for reciprocatory motion, so that they gradually move toward and away from their respective molds. For this purpose the spindle 22 of each mandril supports at its outer end a cross head 106$^a$ as clearly illustrated in Fig. 8, and which is yieldably supported upon the spindle by a spring 107$^a$. This cross head 106$^a$ includes opposed pintles 108 on which are mounted rollers 109, and each of the latter operate between the pairs of spaced rails 110$^a$ of spaced upper and lower continuous track members as illustrated. The lower track member is perfectly straight throughout the entire length of the machine as illustrated in Fig. 1, while the upper track member is formed to provide a substantially V-shaped portion indicated at 111. Consequently as the rollers 109 on the outer end of each spindle moves from the straight portion 110 into one of the inclined branches of the V-shaped portion 111, the cone-shaped mandril starts to move out of its particular mold, and continues to move in this direction until it is completely separated from the mold, which condition exists when the rollers on the outer end of each spindle reach the apex of the V-shaped portion 111 of said track. After the rollers pass the apex of this V-shaped portion, each spindle starts to move in the direction of its mold 18, and as each mold assumes a position with relation to the pan 45 to receive a cake therefrom, its associated mandril begins to enter said mold, with a slight turning motion for the purpose above stated.

Figure 8:
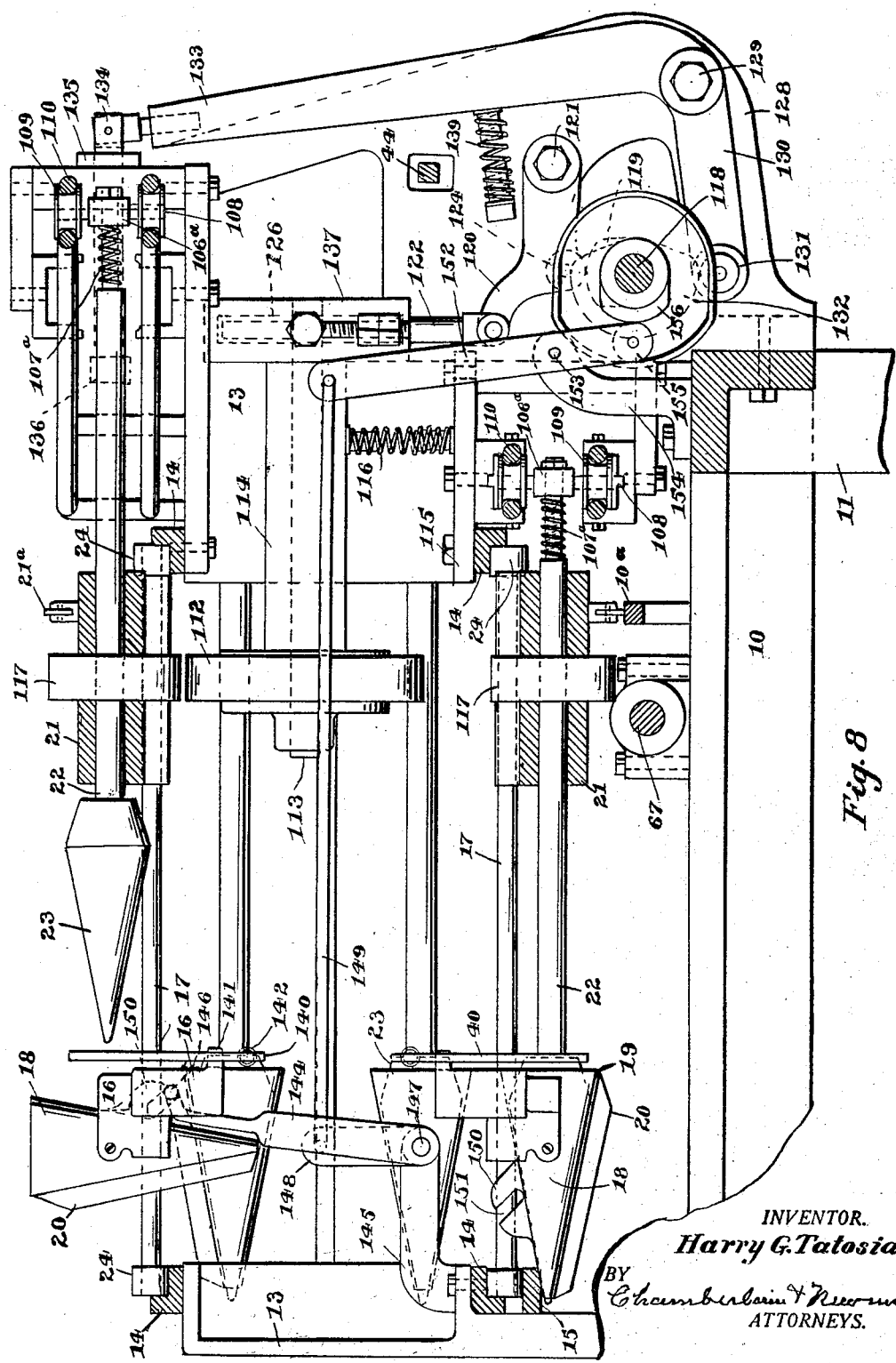
Figure 8 is an enlarged cross sectional view through the upper portion of the machine taken on line 8—8 of Figure 1.

For the purpose of imparting this momentary turning movement to each mandril as it begins to enter the mold, I employ a wheel 112 which is mounted on a shaft 113 journaled in a suitable bearing 114 illustrated in Fig. 8, carried by and forming a part of a housing bracket 137 hingedly supported on the shaft 32, (see Fig. 4). This movable end 114 or bearing of the bracket 137 is supported and vertically operated through the medium of a cam 119 on the shaft 118, as will be later described, the weight of this bearing and of the bracket being yieldably counterbalanced by means of a spring 116 positioned between the bearing 114 and a base 115. Carried by the spindle 22 of each mandril is a relatively small wheel 117, and during the movement of the endless carrier supporting these spindles, the wheel on each of the latter passes over but slightly spaced from the large wheel 112 above referred to. Just as soon as the wheel 117 on each spindle reaches a position directly above the wheel 112, the bearing member 114 is slightly elevated to bring the wheel 112 momentarily into engagement with the wheel 117, and as the wheel 112 is being continuously rotated, a rotating movement is imparted to the particular spindle and its mandril for the purpose above stated.

Arranged along one side of the machine is a shaft 118 which is geared to and rotated from the driven shaft 31, and mounted on this shaft 118 is a cam 119. An arm 120 is pivoted as at 121, see Fig. 8, and is connected by an adjustable rod 122 with the movable bearing 114 of the arm 137 hinged on shaft 32 and enclosing the sprocket chain 123 with which the large wheel 112 is associated. A roller 124 is supported on the arm 120 and engages the cam 119, so that as the cam rotates with the shaft 118, the arm 120 is raised and lowered intermittently, and thereby raises and lowers the hingedly supported bearing member 114 at the proper time to bring the wheel 112 into engagement with the wheels 117 on the adjacent spindles to impart rotary motion to the particular mandril. As above stated the large wheel 112 is continuously rotated by means of an endless sprocket chain 123 which is trained over suitable sprockets 125 mounted on the driven shaft 32, and also over a similar sprocket 126 on the shaft supporting the wheel 112. This is illustrated in Fig. 4, wherein a suitable chain tightener is also indicated at 127.

Mounted on the side of the machine is a bracket 128, and pivotally supported on this bracket as at 129, is a substantially L-shaped lever. The horizontal branch 130 of this lever carries a roller 131 which engages the cam 132 carried by the shaft 118, as illustrated in Fig. 8, so that during the rotation of the cam, the lever is rocked upon its pivot. The vertical branch 133 of this lever terminates at one side of the track members 110, and is pivotally connected to a pusher 134. This pusher is slidably mounted in a sleeve 135 positioned between the upper and lower track members 110 as shown in Fig. 8, and is provided with a recessed head 136 upon its inner end to engage the outer face of the cross head 106 on each spindle 22, just when the latter moves off the adjacent inclined portion of the upper track member into the straight portion 138 thereof as illustrated in Fig. 10.

In other words each spindle, after it passes the apex of the V-shaped portion of the upper track member 111 as illustrated in Fig. 1, starts to move in the direction of its mold 18 until the rollers 109 of each spindle pass from the inclined portion 111 of the upper track member into the straight portion 138 thereof as shown in Fig. 10. It is while the rollers are passing from the inclined portion of the track into the straight portion 138 thereof that the particular mandril enters its mold to grip the pancake, with a slight turning movement, to shape the cake within the mold, and at the same time the lever 133 is actuated to cause the recessed head 136 to engage the outer side of the cross head 106ª to give the mandril its final set position within the mold. The lever 133 is also provided with a cushion spring 139.

Now, after the pancake has been properly rolled about the mandril 22, with the latter fully positioned within its cooperating mold 18, the rollers 109 travel along the straight portion 138 of the upper track member as shown in Fig. 10, thereby holding the mandril in close association with the mold. The parts remain in this position while the rollers pass through the straight lower track member 110, until the rollers move from this lower track member into the adjacent inclined portion of the upper track member as will be readily understood. Just as soon as the rollers enter the inclined portion of the upper track member, each mandril is started to separate itself from its cone and co-operating mold, and continues to do so until the rollers reach the apex of the V-shaped portion of the track as shown in Fig. 1.

However, while the mandrils are being gradually withdrawn from the molds, the cone is retained within the latter, and for this purpose I employ a pair of stripping fingers 140 for each mold. Upon inspection of Fig. 11 it will be noted that these fingers are pivoted as at 141 upon each link of the chain carrying the molds, and directly in advance of the large end of the latter, the stripping fingers having their lower ends normally spread apart by a spring 142. The confronting edges of the fingers 140 are also curved as at 143, to allow the mandril to be withdrawn from the mold, during which time the fingers function to strip the mandril of the cone, retaining the latter within the mold.

When the mandril is fully separated from the mold, with the cone positioned within the latter, the mold is tilted from a horizontal to a vertical position, to facilitate removal of the cone therefrom, as it is at this time of the operation, that the cone is removed from the mold and conveyed to the stacking mechanism in a manner to be presently described. For tilting each mold from a horizontal to a vertical position for the purpose just stated, I provide an arm 144 which is pivoted on a suitable bracket 145 as shown in Fig. 12, and the arm 144 is formed with a rounded offset extremity 146. The arm is supported upon a pin 147 which also supports a short arm 148, the latter being connected with an operating rod 149 to rock the arm 144 at the proper time. Each mold 18 is formed on its under side with a lip 150, the latter being formed with an inclined slot 151 to receive the offset extremity 146 of said arm, and tilt the mold to a vertical position when the arm 144 is actuated. This construction is also illustrated in Fig. 8 wherein it will be noted that the operating rod for the arm 144 is connected at one end with the arm 148, and at its other end with a lever 152. The lever 152 is pivoted at a point between its ends as at 153 on a suitable bracket 154, while the lower end of the lever carries a roller 155 operating in a groove of a cam 156 carried by the shaft 118. Consequently as the shaft 118 rotates, the lever 152 is rocked upon its pivot to reciprocate the rod 149, which in turn operates the arm 144, to tilt the mold from a horizontal to a vertical position at the proper time during the operation of the machine as a whole.

Figure 6:
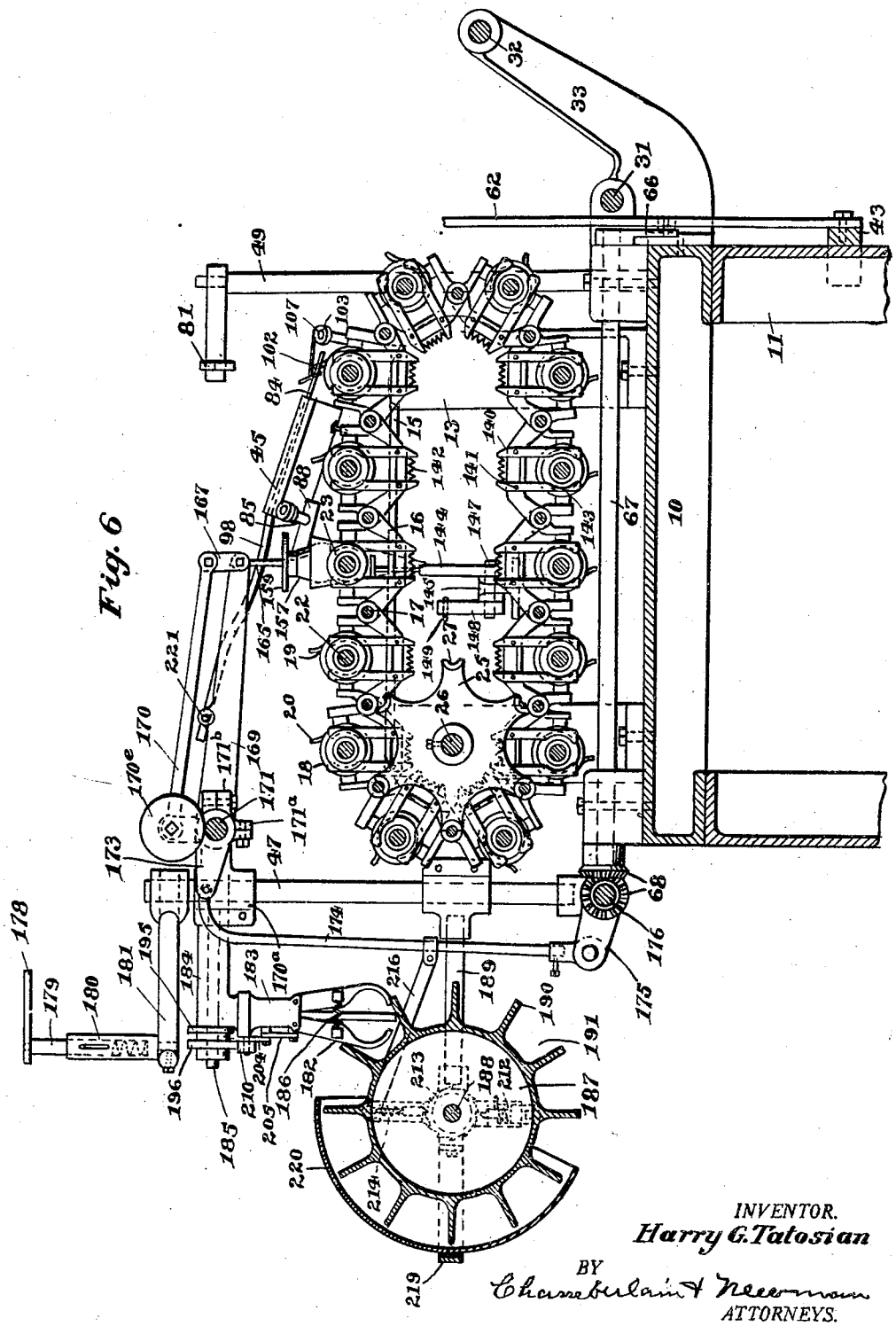
Figure 6 is a longitudinal sectional view taken on line 6—6 of Figure 1.

After the mold has assumed its vertical position, the cone is lifted therefrom by means of a mechanism, including a substantially cone-shaped mandril 157 clearly illustrated in Fig. 20. This mandril is longitudinally slotted as at 158 for the major portion of its length from the bottom thereof, while at the top it is provided with an annular plate constituting a head indicated at 159. Arranged within the slotted portion of this mandril is a pair of tooth edged jaws 160 which are pivoted at 161 to levers 162, the latter being pivoted as at 163 on the mandril. A spring 164 is positioned between the bearing portion 161 of the jaws and levers to normally spread the same apart to normally project them into positions to engage the cone, when the mandril is lowered into the mold containing the cone as shown in Fig. 6. Slidable through the top of the mandril 157 is a shank 165 having a tapered extremity 166 arranged to engage and operate the levers 162 and jaws 160. The vertical movement of this shank 165 within the mandril is limited by the pin 165ª carried by the shank and movable within a slot 166 of the mandril. Carried by the upper end of this shank 165 is a link 167 having spaced openings 168 so that the link can be connected to a pair of spaced parallel arms 169 and 170 respectively. These arms support the mandril in the manner illustrated, so that the latter can be lowered down into the mold containing the cone as shown in Fig. 6, and subsequently lifted therefrom together with the cone and placed on a suitable support adjacent the stacking mechanism as shown in Fig. 9. During this movement of the parts, the arms 169 and 170 remain parallel.

Supported by the posts 46 and 47 are suitable bearings 170ª for a supporting shaft 171, and mounted on this supporting shaft 171 is a sleeve 172 integral with which is formed the arm 169. Projecting from this sleeve 172 is an arm 173 which is terminally connected with the adjacent end of a vertically disposed reciprocating rod 174, the latter being operated from the crank portion 175 of a shaft 176 arranged transversely at one end of the machine, and journaled in bearings secured to the bed thereof. Said shaft 176 being driven from shaft 118 through bevelled gears or pinions 177. Consequently while the shaft 176 is being rotated, the operating rod 174 is reciprocated, to alternately rock the sleeve 172 and its lower arm 169 and the associated arm 170. Upon the shaft 171 is also clamped a bracket 171ª in which a short rocker shaft has its bearing and supports the before mentioned arm 170 which is connected to be operated by the before mentioned shaft 169, see Fig. 6, whereupon the lifting mandril 158 is lowered into the mold to engage the cone contained therein; and to subsequently raise the arms 169 and 170 to the position which they occupy in Fig. 9, in which position the mandril 157 together with the cone is placed upon a substantially fork-shaped support 178. Manifestly during the operation of the arms 169 and 170 in the manner above described, the mandril 157 always remains in a vertical position. It will be seen that the rocker shaft which carries the arm 170 also carries a friction disc 170ᵉ that is engaged by a spring 170ᶠ mounted in a recess of the bracket 171ª to provide sufficient friction to hold the arms 169, 170 and connected parts in either of their adjusted positions.

Figure 7:
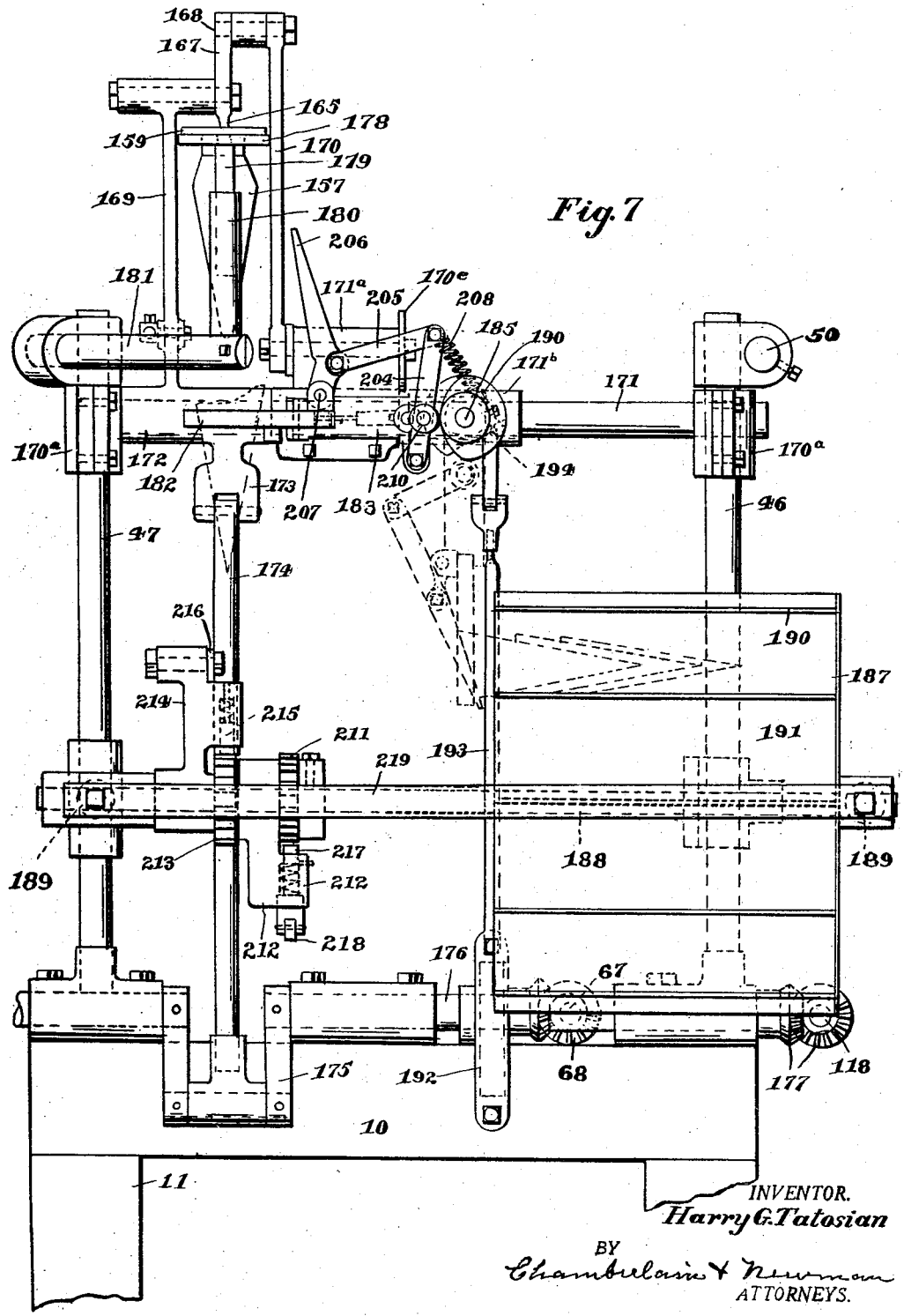
Figure 7 is an enlarged end view of the upper portion of the rear end of the machine, showing the stacking mechanism, which for the sake of clearness was omitted from Figure 3.

The fork-shaped support 178 is mounted on a shank 179 which is yieldably supported in a tubular member 180 mounted on an arm 181 projecting from a bracket on the adjacent corner post 46, and is positioned directly above a pair of relatively movable jaws 182 forming part of the stacking mechanism to be hereinafter described. The jaws 182 for receiving and stacking the cones normally occupy a horizontal position as indicated in Figs. 7 and 13, and directly beneath the support 178, inasmuch as when the mandril 157 is brought to rest upon the support 178, the cone is released therefrom, and allowed to drop off the mandril between the jaws 182 which receive and support the cone. This stacking mechanism next to be described, is supported upon a bracket 171$^b$ secured upon the supporting shaft 171 and includes a projected shaft 185 upon which the sleeve 184 is rockably mounted. In connection with this operation it will be noted that when the mandril is arranged within the support 178, the head 159 of the mandril reposes upon the support, bringing the mandril to a point of rest. However, the arms 169 and 170 are allowed to move a slight distance, after the mandril has been seated upon the support 178, whereupon the shank 165 is moved downwardly through the mandril 157 to spread the levers 162, thereby moving the toothed jaws 160 inwardly to release the cone held thereby, at which time the cone falls off of the mandril 157 into the jaws 182. Manifestly when the arms 169 and 170 are initially moved to lift the mandril 157 off of the support, the shank 165 is again elevated to allow the toothed jaws 160 to be projected outwardly by the influence of the spring 164, and thereby occupy positions to engage another cone, when the mandril is again lowered into a mold in the manner above described.

The jaws 182 above referred to are pivoted at 182$^a$ on an extension 183 projecting centrally from a sleeve 184 which is journaled upon the fixed shaft 185 as clearly illustrated in Figs. 1, 4, 13 to 15 inclusive. Arranged between these jaws 182 is an expansion spring 186 which functions to spread the jaws and thereby release the cone at the proper time in a manner to be hereinafter described. It will be noted upon inspection of Fig. 13 that the inner ends of the jaws are tapered to be spread by the operation of an arrow head.

The jaws 182 form part of a stacking mechanism for the cones, which mechanism also includes a drum 187 journaled on a shaft 188 and arranged at the rear of the machine as illustrated, supported on arms 189 secured to the posts 46 and 47. The drum is provided with spaced partitions 190 which divides the drum into a plurality of longitudinally disposed compartments 191, each of which is adapted to receive a plurality of cones, one nested within the other in a manner to be hereinafter described. As shown in Figs. 4 and 6 the drum 187 is located directly beneath the jaws 182, so that after the latter receives a cone from the mandril 157, while occupying a horizontal position, the jaws are shifted from their horizontal position to a vertical position to transfer the cone into one of the compartments 191 of the stacking drum.

For this purpose the shaft 176 at the adjacent end of the machine is provided with an eccentric 192 which operates a rod 193 connected with an apertured lug or extension 194 projecting from the sleeve 184 supporting the jaws. Consequently as the shaft 176 is rotated, the sleeve 184 is rocked upon its fixed shaft 185, thereby lowering the jaws 182 to the position shown in Fig. 6 to deliver a cone into the stacking drum, and subsequently elevating these jaws 182 to their normal horizontal positions to receive the next cone from the mandril 157.

Upon inspection of Figs. 13 to 15 inclusive it will be noted that the fixed shaft 185 supports a pair of stationary cams 195 and 196 respectively. Sliding within the extension 183 of the sleeve is a rod 197 which carries an arrow head 198 at its forward end, the inclined surfaces of which ride upon roller bearings $g$—$g$ mounted in recesses of the tapered end of the jaws 182 and retain the latter normally positioned relatively to receive and support the cone as it is dropped from the mandril 157. This rod 197 carries a cross pin 199 on which is mounted a roller 200 which engages the cam 195, so that while the jaws are being swung from a horizontal position downwardly to a vertical position, the arrow head 198 is maintained in the position to hold the jaws 182 in cone gripping relation against the action of the spring 186. However, just as soon as the jaws 182 assume their final vertical position, to deliver the cone into the stacking drum, the roller 200 moves into the pocket or recess formed in the cam 195, and thereby allows the pin 199 to move in the slot 202 formed in the extension 183 of the sleeve 184. As the roller 200 moves into the pocket or depression of the cam, the rod 197 is moved rearwardly by the action of the spring 186 to separate the arrow head 198 from the jaws 182. Said expansion spring 186 at the same time serves to slightly separate the jaws, and thus effect a release of the cone so that it can be laid or deposited into the adjacent compartment of the stacking drum.

Depending from this extension 183 of the sleeve is an apertured lug 203 upon which is pivoted an arm 204, and the upper end of this arm is connected by a link 205 with a finger 206 which is pivoted as at 207 upon the forward end of the extension 183 immediately adjacent the jaws. A coil spring 208 is connected with the sleeve, and with a pin 209 projecting laterally from the arm 204 to normally hold the parts in the position illustrated in Fig. 13. The arm 204 is provided with a roller 210 which cooperates with the cam 196, so that while the jaws are being lowered from their normal horizontal position, to their lowered vertical position, to deliver a cone into the stacking drum, the finger 206 is also being moved upon its pivot in the direction of the jaws, until it finally occupies the position illustrated in Figs. 14 and 15. In other words the finger 206 is moved from the position shown in Fig. 13, to the position illustrated in Fig. 14, wherein it will be noted that the finger passes between the jaws 182, engaging the cone and moving it within the stacking drum 188. The spring 208 returns the finger to its normal position as the sleeve 184 is rocked to return the jaws to their normal position.

As hereinabove stated the stacking drum 187 is divided into a plurality of compartments 191, and each compartment is adapted to receive a plurality of cones in nested relation, before the drum is rotated one step or degree, in order to bring the next compartment into proper position with relation to the jaws 182, to receive the cones delivered thereby.

While any suitable means may be employed for stepping up the drum 187 for the purpose just mentioned, I preferably employ a ratchet wheel 211 which is fixed upon the drum shaft 188. Rotatably mounted upon this shaft is an arm 212 which has fixed thereto a ratchet wheel 213 to turn with the arm upon the shaft. An arm 214 is also hinged upon this shaft and serves to carry a pawl 215 for engagement with the teeth of the ratchet wheel 213 for turning the latter and its arm 212 step by step with each vertical movement of the rod 174 and its link connection 216 with the said arm 214. Within an offset portion of the arm 212 is also mounted a radially acting pawl 217 for engagement with the teeth of the ratchet wheel 211 upon the drum shaft 188 with each complete rotation of the said arm and the resultant engagement of the roller 218 carried in the head of the pawl, with the guard rail 219 secured to the bearings from the drum shaft. The pawl 217 is normally spaced from the ratchet wheel 211 by means of its spring and is only brought into engagement with the latter, once during each complete revolution of the arm 212, at which time it engages the ratchet 211 to turn the shaft 188 and the drum 108 one step or degree, to bring the next compartment thereof into proper relation with the jaws 182 to receive the cones therefrom. As clearly illustrated in Fig. 6, the drum 108 is partly surrounded by a suitable housing 220 to better support the stacks of cones within the compartments until properly delivered upon a belt or table beneath the drum.

Carried by the operating rod 174 for the means above described for removing the cones from the molds, is the link 216 which has one end connected with the arm 214, so that each time a cone is delivered from a mold and the jaws 182 of the stacking mechanism, the link 216 is actuated to swing the arm 212 one degree, this being effected by the pawl 215 engaging the ratchet wheel 213.

It will be also observed upon inspection of Figs. 4 and 6, that the connecting rod 98 for the slide 84 of the receiving pan 45, is connected with the arm 169 as at 221 of the cone removing means which supports the mandril 157, so that each time the mandril is lowered to engage a cone within the mold to be emptied, the slide 84 is operated to feed a baked cake to the next mold to be filled. Conversely, when the mandril 157 is shifted from the position illustrated in Fig. 6 to the position illustrated in Fig. 9, to place the mandril upon its support 178, the connecting rod 98 is actuated to slightly elevate to cake receiving pan 45, and arrange the latter and its associated parts in the position illustrated in Fig. 9, ready to receive the next baked cake from the baking iron in the manner above described.

*Operation*

Power is applied to the shafts 31 and 32 which are coupled to be driven from and in unison with a cake baking machine, not shown. The shaft 32 serves to drive the shaft 113 through the sprocket chain 123 for the purpose of continuously driving the friction wheel 112, that engages the wheels 117 upon the spindles 22, carrying the mandrels which roll the cakes into cones.

Shaft 31 is mounted to drive a cam shaft 118 disposed at right angles to the shaft 31 and upon which is mounted cams 119, 132 and 156. This cam shaft is mounted to drive a third shaft 176 that extends across the lower rear side of the machine carrying a crank 175, an eccentric 56 and bevel gear connections with a second longitudinal shaft 67. The last mentioned shaft carries a crank 66 upon the forward end for operating a lever 62 that reciprocates the carriage 61 upon the guide arm 54, whereby the cake picking jaws are advanced to grasp a cake and carry it over and deposit it in the cake receiving pan 45.

Upon the end of the shaft 31 is mounted a crank that engages and operates a pivoted lever 42 that is provided with a rod, and pawl and ratchet connection for rotating shaft 26 that carries a pair of sprocket wheels 25. These sprocket wheels contain a series of aligned sockets 27 for engaging shafts 17 forming a part of an endless chain 21 that travels around the sprocket wheels. Upon the ends of these shafts are rollers 24 that run on endless tracks 114 for guiding the carrier, its spindles, molds and mandrels in their travel around the machine. This chain also carries spindles 22 bearing rotatable mandrels 23. Each of these spindles carries a pulley 117 which at predetermined times is engaged by the before mentioned driving wheel 112 for momentary operation of the mandrel for the purpose of rolling a cake into a cone within the mold 18.

Upon the other end of these spindles 22 is yieldably mounted rollers 109 that are guided between rails 110 of a track whereby the mandrels are moved into and out of relation with the molds. Molds 18 are carried upon links 16 mounted on the rods 17, in alignment with the spindle 22 and are adapted to be tilted from a horizontal to a vertical position for the removal of the formed cone therefrom. These molds are therefore moved with the carrier, spindles and mandrels and serve to receive the cakes which are rolled into the mold where they are held and set until cooled and hardened, when they are lifted out and carried to the stacking mechanism later to be referred to and whereby the cones are stacked horizontally and in nested relation.

The cake picking jaws are advanced to the position shown in Fig. 17 and there engage the edge of a cake from the baking iron in a way to remove and carry the same rearward and deposit it in the cake pan 45 where it is, at the proper time, fed forward through a slot in the mold and rolled into a cone therein.

After the cone has been formed, it cools and hardens as the chain travels and the molds are carried down, under, rearward and upward to an intermediate position as indicated in Figs. 1 and 8, where the slot 151 in the mold is brought to register with the pivotal end 146 of an arm 144 that is operated to tilt the mold from a horizontal to a vertical position with the large end of the mold disposed upward. While in this position the cone lifting and removing mechanism 157 swings forward, enters the cone, engages and lifts the same from the mold and carries it rearward where it is released and dropped into the jaws 182 of the stacking mechanism where it is engaged by the fingers 206 and supported while carried from the vertical position shown in dotted line Fig. 7, to the horizontal nested relation also shown in dotted lines in the same figure. The cone lifting and transporting mechanism is operated through the rod 174 from crank 175, while the nesting mechanism is operated through the rod 193 and eccentric 192. The cone receiving drum 191 includes a series of horizontal pockets, each of which is designed to hold a dozen cones. The drum is therefore timed to operate once with each twelve operations of the nesting mechanism.

While it is believed that from the foregoing description the nature and advantages of the invention will be readily apparent, I desire to have it known that I do not limit myself to what is herein shown and described, and that such changes may be resorted to when desired as fall within the scope of what is claimed.

What I claim is:

1. In a machine of the character described, means for forming cones from baked cakes while in a pliable condition, including an endless carrier, and conical molds supported thereon, means for singly tilting each conical mold to swing its larger open end upward, means for stacking said cones in nested relation, and means for lifting the cones out of the large upper end of the molds and conveying them to said stacking means.

2. In a machine of the character described, means for forming cones from baked cakes while in a pliable condition, including a carrier, conical molds supported thereon, a cooperating conical-shaped mandril for each mold, movable within the latter to roll the cake thereabout into the desired shape, and subsequently movable therefrom, means for singly tilting each conical mold to swing its larger open end upward, means for stacking the cones in nested relation, and means for lifting the cones out of the larger end of the molds and conveying them to said stacking means.

3. In a machine of the character described, means for forming cones from baked cakes while in a pliable condition, means for removing the cones from said forming means, and means actuated by the last mentioned means for singly feeding the cakes to said cake forming means.

4. In a machine of the character described, means for forming cones from baked cakes while in a pliable condition, means for stacking said cones in nested relation, means for removing the cones from said forming means and conveying the same to the stacking means, and means actuated by said removing means for singly feeding the cakes to the cone forming means.

5. In a machine of the character described, means for forming cones from baked cakes while in a pliable condition, means including a cake receiving pan, from which the cakes are singly fed to said forming means, means for stacking the cones in nested relation, and means for removing the cones from the forming means and conveying the same to the stacking means, and controlling the operation of said feeding means.

6. The combination with a baking machine, of means for forming cones from baked cakes while in a pliable condition, comprising in part a conical shaped mold, means including a cake receiving pan, from which the cakes are singly fed into the cone forming means, means for advancing the cake into the small end of the mold faster than into the larger end, and means for singly delivering the cakes from the baking machine to said pan.

7. The combination with a baking machine, of means for forming cones from baked cakes while in a pliable condition, including a conical mold and mandrel, means for singly feeding the cakes into the cone forming means and means for singly tilting each conical mold to swing its larger open end upward, means for singly delivering the cakes from the baking machine to said feeding means, means for stacking the cones in nested relation, and means for lifting the cones out of the larger end of said conical mold and conveying the same to said stacking means.

8. The combination with a baking machine, of means for forming cones from baked cakes while in a pliable condition, means for singly feeding the cakes into said forming means, means for advancing the cake faster into the smaller end of the mold than in the larger end, means for singly delivering the cakes from the baking machine to said feeding means, means for stacking the cones in nested relation, and lifting means for removing the cones out of the larger end of the mold and conveying them to the stacking means, and also controlling the operation of said feeding means.

9. The combination with a baking machine, of means for forming cones from baked cakes while in a pliable condition, including a carrier, a plurality of conical molds supported thereon, mandrels adapted to be moved into and out of said molds, means for operating the said carrier, means for singly feeding each mold with a cake as it reaches a predetermined position in its course of travel, means for tilting the molds irrespective of the mandrels, means for vertically lifting the cones out of said molds while in a vertical position, and means for singly delivering the cakes from the baking machine to said feeding means.

10. The combination with a baking machine, of means for forming cones from baked cakes while in a pliable condition, including a carrier, a plurality of conical molds supported thereon, means for operating the carrier, means for singly feeding each mold with a cake as it reaches a predetermined position in its course of travel, means for swinging the large open end of the molds upward, means for singly delivering the cakes from the baking machine to said feeding means, and means for lifting the cones out of the larger ends of the molds.

11. The combination with a baking machine, of means for forming cones from baked cakes while in a pliable condition, including a carrier, a plurality of conical-shaped molds and mandrels supported thereon, means for operating the carrier, means for singly feeding each mold with a cake when it reaches a predetermined position in its course of travel, means for singly tilting each conical mold to swing its larger open end upward, means for singly delivering the cakes from the baking machine to said feeding means, and means for lifting the cones out of the molds and operating said feeding means.

12. The combination with a baking machine, of means for forming cones from baked cakes while in a pliable condition, including a carrier, a plurality of conical-shaped molds supported thereon, means for operating the carrier, means for singly feeding each mold with a cake when it reaches a predetermined position in its course of travel by advancing the cake faster into the small end of the mold, means for singly delivering the cakes from the baking machine to said feeding means, means for tilting each mold to bring its larger end uppermost, means for stacking the cones in nested relation, and means for lifting the cones out of the molds and conveying them to the stacking means, and simultaneously operating said feeding means.

13. The combination with a baking machine, of means for forming cones from baked cakes while in a pliable condition, including a carrier, a plurality of molds supported thereon, and a conical-shaped mandril for each mold, means for operating the carrier, means for gradually sliding each mandril into and out of its respective mold, means for singly feeding each mold with a cake when it reaches a predetermined position in its course of travel, means for slightly turning each mandril as it enters its mold to grip the cake and roll the latter about the mandril, as the cake is being fed into the mold, means, for singly tilting each conical mold to swing its larger open end upward, means for lifting the cones out of the molds while in said tilted position and conveying them therefrom, and means for singly delivering the cakes from the baking machine to said feeding means.

14. The combination with a baking machine, of means form forming cones from baked cakes while in a pliable condition, including a carrier, a plurality of molds supported thereon, and a cone-shaped mandril for each mold, means for operating the carrier, means for singly feeding each mold with a cake when it reaches a predetermined position in its course of travel, means for gradually moving each mandril into and out of its respective mold, means for rotating each mandril simultaneously with the entry of the latter to the cake within the mold, whereby the cake is gripped and rolled about the mandril into its desired shape, means for singly delivering the cakes from the baking machine to said feeding means, means for singly tilting each conical mold to swing its larger open end upward, and means for singly lifting the cones out from the molds and conveying them to stacking mechanism and simultaneously operating said feeding means.

15. The combination with a baking machine, of means for forming cones from baked cakes while in a pliable condition, including a carrier, a plurality of molds supported thereon, and a conical-shaped mandril for each mold, means for operating said carrier, means for singly feeding a cake into each mold as the latter reaches a predetermined position in its course of travel, means for gradually moving each mandril into and out of its respective mold at predetermined periods, means for rotating each mandril simultaneously with the entry of the latter and the cake into the mold, whereby the cake is gripped by the mandril and rolled about the latter into the desired shape, means for singly delivering the cakes from the baking machine to said feeding means, means for stacking the cones as finished products in nested relation, means for swinging the molds on their pivots to bring their larger ends up, and means for lifting the cones out of the molds while in a vertical position and conveying the same to said stacking means and controlling the operation of said feeding means.

16. The combination with a baking machine, of means for forming cones from baked cakes while in a pliable condition, including a carrier, a plurality of molds normally arranged horizontally thereon, but individually capable of pivotal movement, and a conical-shaped mandril for each cone, means for operating the carrier, means for singly feeding a cake into each mold as the latter reaches a predetermined position in its course of travel, means for gradually moving each mandril into and out of its respective molds, means for turning each mandrel simultaneously with the entry of the latter and said cake within the mold, whereby the cake is gripped by the mandril and rolled thereabout into its desired shape, means for singly delivering the cakes from the baking machine to said feeding means, means for singly tilting each mold from its normal horizontal to a vertical position, subsequent to the removal of its mandril therefrom, and means for lifting the cone out of each vertically disposed mold and conveying them to stacking mechanism and means for receiving said cones and stacking the same in nested relation.

17. The combination with a baking machine, of means for forming cones from baked cakes while in a pliable condition, including a carrier, a plurality of slotted molds normally arranged horizontally thereon, but capable of being individually shifted to a vertical position, and a conical-shaped mandril for each mold, means for operating the carrier, means for singly feeding a cake into each mold as the latter assumes a predetermined position in its course of travel, means for gradually moving each mandril into and out of its respective mold, means for turning each mandril simultaneously with the entry of the latter and the cake within the mold, whereby the cake is gripped by the mandril and rolled about the latter into its desired shape, means for singly delivering the cakes from the baking machine to said feeding means, means for singly tilting each mold from its horizontal to a vertical position, subsequent to the removal of the mandril therefrom, means for receiving the cones in a vertical position and stacking the cones in a horizontal position as finished products in nested relation, and lifting means for removing the cone from within each vertical mold and conveying the same to said stacking means.

18. The combination with a baking machine, of means for forming cones from baked cakes while in a pliable condition, including a carrier, a plurality of slotted molds supported thereon, and a conical-shaped mandril for each mold, means for operating the carrier, means for singly feeding a cake into each mold as the latter assumes a predetermined position in its course of travel, means for singly delivering the cakes from the baking machine to said feeding means, means for gradually moving each mandril into and out of its respective mold, means for turning each mandril simultaneously with the entry of the latter and said cake into the mold, whereby the cake is gripped by the mandril and rolled thereabout into its desired shape, and means for subjecting each mandril to a longitudinal impact while entering the mold, to finally seat the mandril within the latter.

19. The combination with a baking machine, of means operated therefrom for forming cones from baked cakes while in a pliable condition, including a carrier, a plurality of slotted molds supported thereon, and a conical-shaped mandril for each mold, means for singly feeding each mold with a cake, including a cake receiving pan, a slide operating therein for moving the cake into the mold, means for singly delivering the cakes from the baking machine to said pan, and means for removing the cones from the molds as finished products.

20. The combination with a baking machine, of means operated therefrom for forming cones from baked cakes while in a pliable condition, including a carrier, a plurality of slotted molds supported thereon, and a conical-shaped mandril for each cone, means for singly feeding a cake into each mold and including a cake receiving pan, a slide operating thereon for feeding the cake into the mold, means for singly delivering the cakes from the baking machine to said pan, and means for removing the cones from the molds as finished products and controlling the operation of said slide.

21. The combination with a baking machine, of means operated therefrom for forming cones from baked cakes while in a pliable condition, including a carrier, a plurality of slotted molds supported thereon, a cone-shaped mandril for each mold, means for singly feeding the cakes into each mold, including a cake receiving pan, a slide operating thereon, a guide located at one end of the pan and cooperating with said slide to direct the cake within the mold, means for singly delivering the cakes from the baking machine to said pan, and means for singly removing the cones from the molds as finished products.

22. The combination with a baking machine, of means operated therefrom for forming cones from baked cakes while in a pliable condition, including a carrier, a plurality of slotted molds supported thereon, and a conical-shaped mandril for each mold, means for singly feeding each mold with a cake, including a cake receiving pan, a slide operating thereon, a pivoted gripping plate carried by said slide and cooperating therewith to move the cake from the pan into the mold, a guide arranged at one end of the plate for directing the cake within the mold, means for singly delivering the cakes from the baking machine onto said pan, means for operating said slide, and means whereby said plate is elevated when the slide is moved to its retracted position.

23. The combination with a baking machine, of means operated therefrom for forming cones from baked cakes while in a pliable condition, including a carrier, a plurality of slotted molds mounted thereon, a cone-shaped mandril for each mold, means for singly feeding each mold with a cake, including a cake receiving pan, a slide operating thereon, a pivoted cake gripping plate carried by the slide, a guide arranged at one end of the pan and connected therewith to direct the cake from the pan into the mold, means for singly delivering the cakes from the baking machine to said pan, means for singly removing the cones from the molds as finished products, means controlled by the last mentioned means for operating said slide, and means whereby said pivoted plate is raised and lowered incident to the movement of the slide.

24. The combination with a baking machine, of means operated therefrom for forming cones from baked cakes while in a pliable condition, including a carrier, a plurality of slotted molds mounted thereon, a cone-shaped mandril for each mold, means for singly feeding each mold with a cake, and including a cake receiving pan mounted for pivotal movement, a guide pivotally supported beyond one end of the pan and also pivotally connected with the adjacent end thereof, a slide operating on the pan, a cake gripping plate pivoted on the slide, and cooperating with the latter and said guide to move the cake from the pan into the mold, means for operating said slide, means whereby said pan and guide are lowered into close proximity to the mold when the slide is moved forwardly, and raised above the mold when moved in a rearward direction, means whereby said plate is simultaneously elevated, means for singly delivering the cakes from the baking machine onto said pan when the latter is in its elevated position, and means for singly removing the cones from the molds as finished products.

25. The combination with a baking machine, of means for forming cones from baked cakes while in a pliable condition, including a carrier, a plurality of slotted cone-shaped molds supported thereon, and a correspondingly shaped mandril for each mold, a cake receiving pan, means for singly delivering the cakes from the baking machine to said pan, a slide movable thereon, a cake gripping plate pivotally supported on the slide for both vertical and lateral movements relative thereto, means for operating said slide, means for normally holding the plate at a slight angle with relation to the slide, and means for shifting said plate annularly when in cake engaging position, and thereby feed the cake into the small end of the mold slightly faster than into the larger end thereof.

26. The combination with a baking machine, of means for forming cones from baked cakes while in a pliable condition, including a carrier, a plurality of slotted cone-shaped molds supported thereon, and a correspondingly shaped mandril for each mold, a cake receiving pan, means for singly delivering the cakes from the baking machine to said pan, a slide movable on the latter, a cake gripping plate pivotally supported on the slide for both vertical and lateral movements relative thereto, yieldable means normally holding said plate at an angle with relation to the slide, means for shifting said plate annularly, against the tension of said yieldable means, when in cake engaging position, to feed the cake into the small end of the mold slightly faster than in the large end thereof, and means for operating said slide.

27. The combination with a baking machine, of means for forming cones from baked cakes while in a pliable condition, including a carrier, a plurality of slotted cone-shaped molds supported thereon and a cooperating correspondingly shaped mandril for each mold, a cake receiving pan, means for singly delivering the cakes from the baking machine to said pan, a slide movable thereon, a cake gripping plate pivotally supported on the slide for both vertical and lateral movements relative thereto, yieldable means normally holding said plate at an angle with relation to the slide, means for shifting said plate annularly against the tension of the yieldable means, when in cake engaging position, and thereby feed the cake into the small end of the mold slightly faster than into the larger end thereof, means for operating said slide, and means for raising and lowering said plate as the slide is moved in opposite directions.

28. The combination with a baking machine, of means for forming cones from baked cakes while in a pliable condition, a cake receiving pan, an arm, a slide supported thereon, means for operating said slide, a pair of cake gripping jaws carried by the slide in advance thereof, and operable to singly lift the cakes from the baking machine and deposit the same on said pan, means for opening and closing said jaws incident to the reciprocatory movement of the slide, and means for singly feeding the cakes from the pan to said cake forming means.

29. The combination with a baking machine, of means for forming cones from baked cakes while in a pliable condition, a cake receiving pan, an arm pivotally supported at one end, a slide supported thereon, means for raising and lowering said arm, means for operating said slide, a pair of cake gripping jaws carried by the slide in advance thereof and adapted to singly lift the cakes from the baking machine and deposit the same on said pan, a pair of spaced cams, means carried by the slide and alternately cooperating with said cams to open and close said jaws as the slide is reciprocated, and means for singly feeding the cakes from the pan to said cake forming means.

30. The combination with a baking machine, of means for forming cones from baked cakes while in a pliable condition, a cake receiving pan, an arm, a slide supported thereon, means for operating said slide, a pair of cake gripping jaws carried by the slide in advance thereof and adapted to singly lift the cakes from the baking machine and deposit the same upon said pan, means for alternately opening and closing said jaws as the slide is reciprocated, means for singly feeding the cakes from the pan to said cake forming means, and means for singly removing the cones from the last mentioned means and operable to control said feeding means.

31. The combination with a baking machine, of means for forming cones from baked cakes while in a pliable condition, means for singly feeding the cakes to said forming means, means for singly delivering the cakes from the baking machine to said feeding means, a rotatably horizontally mounted drum having spaced compartments in which said cones are stacked in nested relation, means for horizontally stacking the cones therein, and means for lifting the cones out of said forming means and conveying the same to said stacking means.

32. The combination with a baking machine, of means for forming cones from baked cakes while in a pliable condition, means for singly feeding the cakes to said forming means, means for singly delivering the cakes from the baking machine to said feeding means, a rotatably horizontally mounted drum having compartments, in each of which a plurality of cones are adapted to be horizontally stacked in nested relation, means for stacking the cones in each compartment, means for lifting the cones out of said forming means and conveying the same to the stacking means, and means for intermittently rotating said drum to singly present each compartment thereof to said stacking means at predetermined periods.

33. The combination with a baking machine, of means for forming cones from baked cakes while in a pliable condition, means for singly feeding the cakes to said forming means, means for singly delivering the cakes from the baking machine to the feeding means, a rotatably supported drum having spaced compartments adapted to receive the cones in nested relation, a pair of relatively movable cone receiving jaws normally arranged horizontally, means for removing the cones from said forming means and conveying the same to said jaws, and means for lowering said jaws from a horizontal to a vertical position to deliver the cones into the adjacent compartment of said drum.

34. The combination with a baking machine, of means for forming cones from baked cakes while in a pliable condition, means for singly feeding the cakes to said forming means, means for singly delivering cakes from the baking machine to said feeding means, a rotatably supported drum having spaced compartments, adapted to singly receive the cones in stacked relation, a pair of relatively movable yieldably connected cone receiving jaws normally arranged horizontally, means for singly removing the cones from said forming means and conveying the same to said jaws, means for moving said jaws from a horizontal to a vertical position to deliver the cones supported thereby into one of said compartments, means for spreading said jaws as the latter are swung to their delivering position with relation to the drum, and means simultaneously operable to project the cone from between the jaws into said compartment.

35. The combination with a baking machine, of means for forming cones from baked cakes while in a pliable condition, means for singly feeding the cakes to said forming means, means for singly delivering the cakes from the baking machine to said feeding means, a pair of relatively movable yieldably connected cone receiving jaws, means pivotally supporting said jaws normally in a horizontal position, means for singly removing the cones from said forming means and conveying the same to said jaws, a rotatably supported drum having spaced compartments adapted to singly receive the cones in nested relation, means for swinging said jaws from their normal horizontal to a vertical position to deliver its cone into one of said compartments, means for spreading said jaws as they approach said drum, means normally supported above said jaws and movable between the latter to project the cone therefrom into said compartment, as said jaws assume their final delivery position, means for automatically returning the last mentioned means to normal position, incident to the return of said jaws to their normal position, and means for intermittently rotating said drum to singly present each compartment thereof for use.

36. The combination with a baking machine, of means for forming cones from baked cakes while in a pliable condition, means for singly feeding the cakes to said forming means, means for singly delivering the cakes from the baking machine to said feeding means, a rotatably supported drum having spaced compartments adapted to singly receive the cones in nested relation, means for stacking the cones in said compartments and including a pair of relatively movable yieldably connected cone receiving jaws, a yoke-shaped support located above the normal position of said jaws, means for singly removing the cones from said forming means and conveying the same to said jaws, said last mentioned means including a cone-shaped mandril, a pair of toothed jaws movably supported on said mandril, means for spreading said jaws to engage the cone when the mandril is lowered into the latter to remove the same from said forming means, means for resting the mandril on said support, means for retracting said toothed jaws to release the cone from the mandril when the latter is brought to rest upon said support, and thereby deliver the cone into said relatively movable jaws, and means for intermittently rotating said drum to singly present each compartment for use.

Signed at Bridgeport, in the county of Fairfield and State of Connecticut, this 17th day of June, A. D. 1929.

HARRY G. TATOSIAN.